United States Patent [19]
Miller

[11] Patent Number: 5,805,911
[45] Date of Patent: Sep. 8, 1998

[54] WORD PREDICTION SYSTEM

[75] Inventor: John W. Miller, Kirkland, Wash.

[73] Assignee: Microsoft Corporation, Redmond, Wash.

[21] Appl. No.: 382,074

[22] Filed: Feb. 1, 1995

[51] Int. Cl.$^6$ .................................................. G06F 15/00
[52] U.S. Cl. ........................................................ 395/796
[58] Field of Search ..................... 364/419.15, 419.09; 395/161, 155, 796; 345/792, 795, 797

[56] References Cited

U.S. PATENT DOCUMENTS

| | | | |
|---|---|---|---|
| 4,558,302 | 12/1985 | Welch | 340/347 |
| 4,814,746 | 3/1989 | Miller et al. | 341/95 |
| 4,955,066 | 9/1990 | Notenboom | 382/56 |
| 4,969,097 | 11/1990 | Levin | 364/419 |
| 5,109,433 | 4/1992 | Notenboom | 382/40 |
| 5,261,091 | 11/1993 | Yuyama | 395/600 |
| 5,367,453 | 11/1994 | Capps et al. | 364/419.13 |

OTHER PUBLICATIONS

*The Reactive Keyboard,* (Table of Contents, Chapters 2, 3, 5, and 6 submitted), by John J. Darragh, Dept. of Computer Science, University of Calgary, Alberta, Canada and Ian H. Witten, Department of Computer Science, University of Waikato,Hamilton, New Zealand, Cambridge University Press 1992.

Implementation of the Substring Test by Hashing, by Malcolm C. Harrison, New York University the *Communications of the ACM,* Dec. 1971, vol. 14, No. 12.

A Space–Economical Suffix Tree Construction Algorithm by Edward M. McCreight, Xerox Palo Alto Research Center, Palo Alto, California the *Journal of the Association for Computing Machinery,* vol. 23, No. 2, Apr. 1976, pp. 262–272.

*Primary Examiner*—Phu K. Nguyen
*Attorney, Agent, or Firm*—Jones & Askew, LLP

[57] ABSTRACT

A computer-implemented method of providing and selecting multiple text prediction from text entered from multiple windows of a computer system using an application-independent text prediction system. Application-independence is the ability to work with many different applications without being customized for each applications. Because different prediction methods are appropriate for different applications, multiple prediction components called "prediction modules" provide text predictions based on each prediction module's prediction method from which the best prediction may be displayed. The best prediction from the results of the multiple methods may be displayed. In accordance with providing multiple predictions from various modules, a method is provided for choosing which modules' predictions should be used from the set of possibly contradictory predictions. Each prediction module produces a weighted list of predictions. The prediction module weights are based on the prediction modules' estimation of the probability that the completion text will be entered by the user. The resulting best prediction or predictions with the greatest weights may then be presented to the user.

22 Claims, 15 Drawing Sheets

Fig_1

Fig_2

Fig_3

Fig_6

PREDICTION LIST 67

| | NUMBER OF CORRECT PREDICTIONS | NUMBER OF PREDICTION ATTEMPTS |
|---|---|---|
| FIELD 1 | 4 | 8 |
| FIELD 2 | 3 | 7 |
| • | | |
| • | | |
| • | | |
| FIELD 10 | 1 | 1 |

Fig_5

61

| RECENTLY USED FIELD ID #'S |
|---|
| 7 |
| 5 |
| 3 |
| 6 |
| 4 |
| 9 |
| 8 |
| 10 |

BEST PREDICTION FIELD PAIRS

63

| SELECTED FIELD ID # | BEST PREDICTION FIELD ID # FOR SELECTED FIELD |
|---|---|
| 1 | 1 |
| 2 | 2 |
| 3 | 3 |
| 4 | 1 |
| 5 | 5 |
| 6 | 6 |
| 7 | 7 |
| 8 | 8 |
| 9 | 9 |
| 10 | 3 |

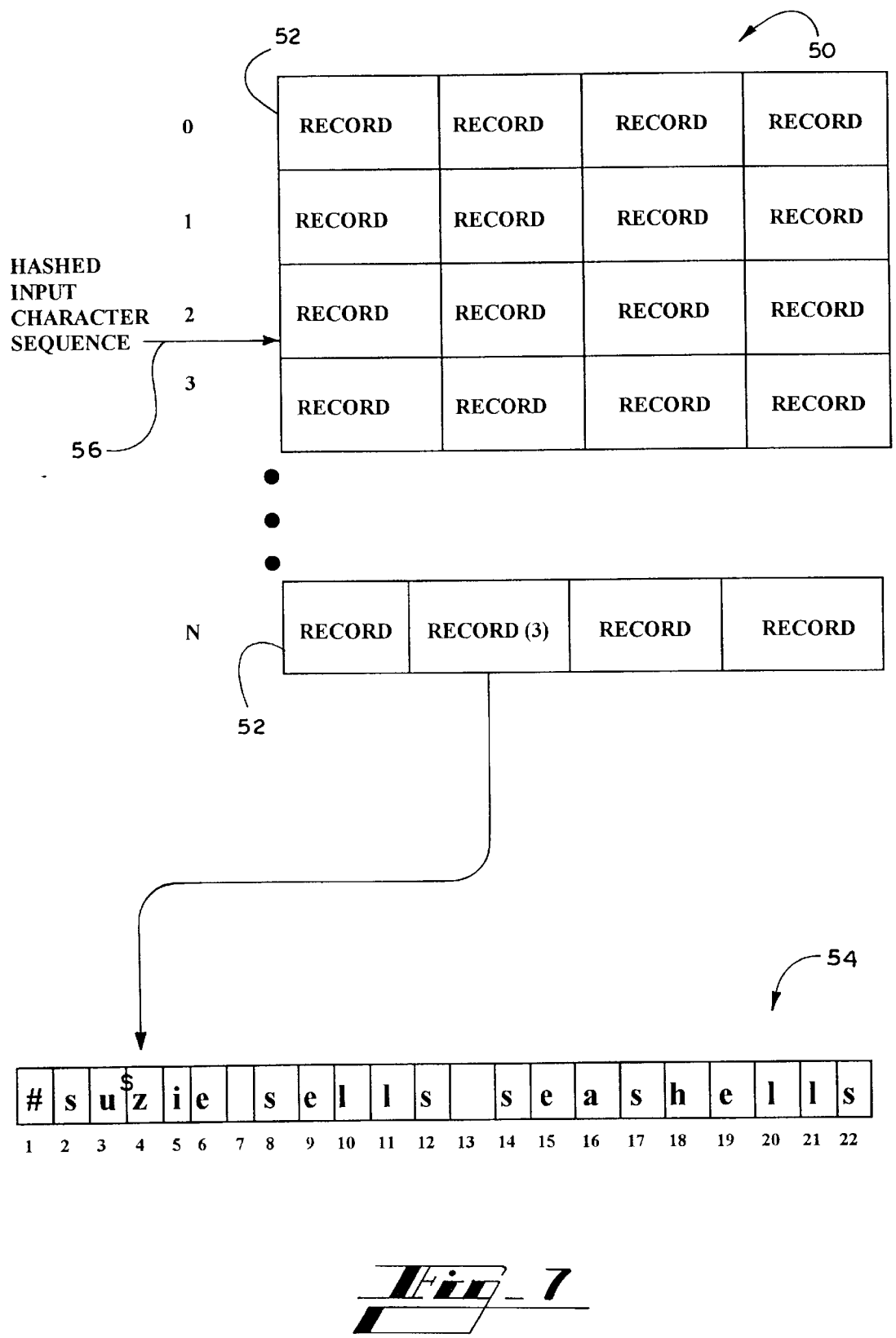
Fig_7

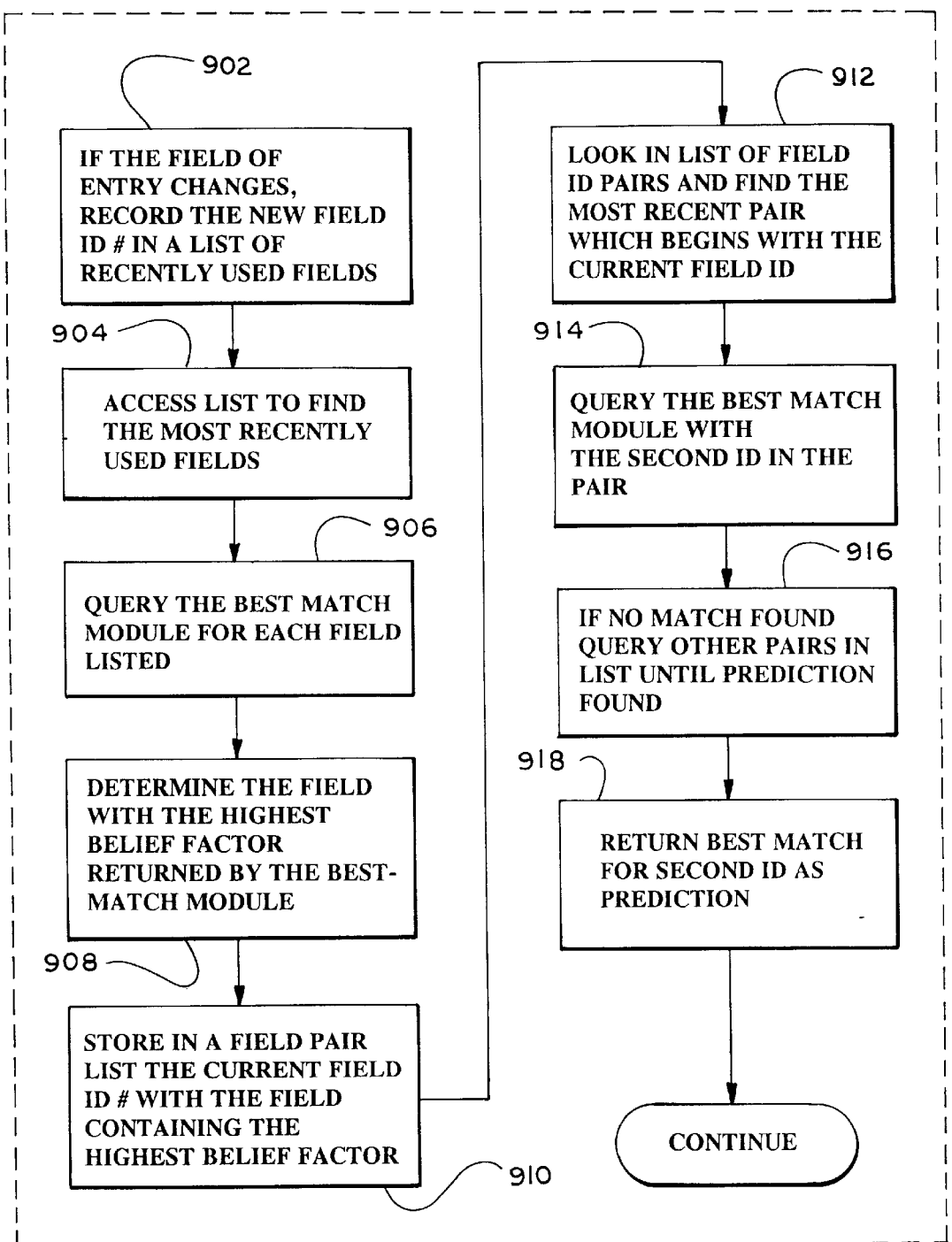
Fig_9A

| C | SEED | DATABASE ADDRESS HASH (C, SEED) | HSTRING |
|---|---|---|---|
| '_' | 0 | 5885 | "_" |
| '_' | 5895 | 20195 | "_S" |
| '_' | 13685 | 11285 | "_SE" |
| '_' | 15420 | 10860 | "_SELLS_S" |
| 'S' | 0 | 1690 | "S" |
| 'A' | 0 | 10075 | "A" |
| 'A' | 5895 | 15230 | "AS" |
| 'E' | 0 | 18455 | "E" |
| 'E' | 5885 | 13210 | "E_" |
| 'E' | 5965 | 12765 | "ELLS_S" |
| 'E' | 11285 | 14590 | "E_SE" |
| 'E' | 12175 | 1785 | "EL" |
| 'E' | 17895 | 1385 | "ELL" |
| 'E' | 20195 | 4300 | "E_S" |
| 'H' | 0 | 3795 | "H" |
| 'H' | 1385 | 1555 | "HELL" |
| 'H' | 1785 | 530 | "HEL" |
| 'H' | 18455 | 18030 | "HE" |
| 'I' | 0 | 5890 | "I" |
| 'I' | 18455 | 17635 | "IE" |
| 'L' | 0 | 12175 | "L" |
| 'L' | 2185 | 16625 | "LS_S" |
| 'L' | 5895 | 19340 | "LS" |
| 'L' | 12175 | 17895 | "LL" |
| 'L' | 16625 | 5965 | "LLS_S" |
| 'O' | 10860 | 19525 | "O_SELLS_S" |
| 'S' | 0 | 5895 | "S" |
| 'S' | 1385 | 18890 | "SELL" |
| 'S' | 1785 | 1320 | "SEL" |
| 'S' | 5885 | 20205 | "S_" |
| 'S' | 11285 | 13405 | "S_SE" |
| 'S' | 12765 | 15420 | "SELLS_S" |
| 'S' | 18455 | 13685 | "SE" |
| 'S' | 20195 | 2185 | "S_S" |
| 'U' | 0 | 10085 | "U" |
| 'Z' | 0 | 20560 | "Z" |

Fig_13

| ITERATIONS OF STEPS 1116 AND 1118 | DATABASE AT STEP 1116 OF FIG. 11 | | DATABASE AT STEP 1118 OF FIG. 11 | |
|---|---|---|---|---|
| | DATABASE ADDRESS | DATABASE CONTENTS | DATABASE ADDRESS | DATABASE CONTENTS |
| 1 | [1690 ] | INVALID | [1690 ] | 2 |
| 2 | [10085] | INVALID | [10085] | 3 |
| 3 | [20560] | INVALID | [20560] | 4 |
| 4 | [5890 ] | INVALID | [5890 ] | 5 |
| 5 | [18455] | INVALID | [18455] | 6 |
| 6 | [5885 ] | INVALID | [5885 ] | 7 |
| 7 | [5895 ] | INVALID | [5895 ] | 8 |
| 8 | [18455] | 6 | [18455] | 9 |
| 9 | [13685] | INVALID | [17635] | 6 |
| 10 | [12175] | INVALID | [12175] | 10 |
| 11 | [12175] | 10 | [12175] | 11 |
| 12 | [17895] | 8 | [1785 ] | 10 |
| 13 | [5895 ] | 8 | [ 5895 ] | 12 |
| 14 | [19340] | INVALID | [20195] | 8 |
| 15 | [5885 ] | 7 | [5885 ] | 13 |
| 16 | [20205] | INVALID | [13210] | 7 |
| 17 | [5895 ] | 12 | [5895 ] | 14 |
| 18 | [20195] | 8 | [19340] | 12 |
| 19 | [2185 ] | INVALID | [4300 ] | 8 |
| 20 | [18455] | 9 | [18455 ] | 15 |
| 21 | [13405] | INVALID | [14590 ] | 9 |
| 22 | [10075] | INVALID | [10075 ] | 16 |
| 23 | [5895 ] | 14 | [5895 ] | 17 |
| 24 | [15230] | INVALID | [20195 ] | 14 |
| 25 | [3795 ] | INVALID | [3795 ] | 18 |
| 26 | [18455] | 15 | [18455 ] | 19 |
| 27 | [18030] | INVALID | [13685 ] | 15 |
| 28 | [12175] | 11 | [12175 ] | 20 |
| 29 | [1785 ] | 10 | [17895 ] | 11 |
| 30 | [530   ] | INVALID | [1320 ] | 10 |
| 31 | [12175 ] | 20 | [12175 ] | 21 |
| 32 | [17895 ] | 11 | [1785 ] | 20 |
| 33 | [1555 ] | INVALID | [18890 ] | 11 |
| 34 | [5895 ] | 11 | [5895 ] | 22 |

*Fig_14*

WORD PREDICTION SYSTEM

TECHNICAL FIELD

The present invention relates generally to the field of communication aids and more particularly to the field of computer implemented word prediction systems.

BACKGROUND OF THE INVENTION

General purpose digital computers are widely used for text based communications including word processing and electronic mail. Text is generally entered into the computer by means of a keyboard. Other text input devices include a touch-sensitive screen overlaid on top of a graphical image of a keyboard, or a system which detects the motion of a pen in combination with handwriting recognition software. The text is then sent to a particular software application running on the computer.

Typically, a computer system effectively allows for multiple applications to be running simultaneously. These applications appear in different portions of the screen (called windows), with usually only one window or field of entry at a time receiving text input. Regardless of the input method used, the speed at which text can be entered into a computer is a factor in effective and efficient use of the computer.

Because there are a limited number of words available in any given language, many of the words forming the vocabulary of the given language are used frequently. Recognizing that various patterns of language or words are repeated, computer systems have been devised which complete text, based on the prior history of text entered.

Default text completion is a feature of a user interface which offers simple shortcuts for entering very common input. These shortcuts speed text entry and also serve as a memory aid. For example, most recently used (MRU) lists are utilized in text completion applications. The MRU list gives a menu of recently used names or files so that they can be quickly opened without retyping the name. The list of possible completions can be viewed as predictions of likely text input. Additionally, some computer programs complete input text based on a record of prior words entered. For example, some personal finance programs maintain a record of a person's bank deposits and checks written. In order to speed entry of the information on a bank check, the program keeps a list of check payees. This list is used to complete the payee name automatically after the first few letters of the payee have been typed by the user. Such word prediction systems have been particularly used in computer systems in which there are a limited number of selected terms that may be predicted.

In addition to MRU prediction mechanisms, other text completion mechanisms may include: English dictionaries and custom dictionaries such as a list of city names. With a dictionary prediction mechanism, the information contained within the dictionary does not generally change based on text that has been entered within the computer system. The dictionary prediction mechanism provides predictions based on the originally supplied information or on information that may be provided during periodic updates of the dictionary.

In word prediction systems, an input character may be analyzed, with respect to the prior history of text entered, to predict the text likely to follow the input character or substring of characters entered. Because word prediction systems are based upon a prior history of text entered, the search time and amount of storage required for the systems are important parameters. For some of these word prediction systems either a linear or a binary search is used to scan the text history in order to provide a text prediction. A linear search operates by sequentially examining each element in a list until the target element is found or the list has been completely processed. Linear searches are primarily used with very short lists. A binary search locates an item by repeatedly dividing an ordered list in half and searching the half that it is known to contain the item. A binary search requires a value for the input that can be compared against values in a list of items arranged in a known sequence, such as ascending order. The binary search begins by comparing the input value against the value in the middle of the list. If the input value is greater than the middle value, the lower half of the list is discarded and the search concentrates on the upper half. The input value is again compared with a value in the middle of the new list and again half of the list is discarded. The process continues, with the input value being compared against the middle of each succeeding smaller list, until the desired item is found.

In using either of these search methods, the time required for a prediction can become substantial. Also, without special provisions for storage of various strings of the text, the search time required can also become substantial as searches of repeated substrings may be duplicated.

The computer programs discussed above are generally application-dependent programs, in that, the programs have been customized to work only with a particular application. Application-dependent prediction can cause wasteful duplications. Duplication of software occurs when similar prediction programs are implemented by several different applications. Duplication of memory can also be a problem. For example, it can be wasteful to have several different applications keep separate histories of commonly used words. Another problem with application independent modeling is that since the prediction processes do not take advantage of text input into other applications, there are common repetitive patterns of text input which are not used to improve prediction.

Thus, there is a need in the art for a text prediction system that may operate with multiple applications with little or no application specific programming and that provides a fast search method for text in a text history array.

SUMMARY OF THE INVENTION

Generally, the present invention is an application-independent text prediction system. Generally, application-independence is the ability to work with many different applications without being customized for each application. Because different prediction methods are appropriate for different applications (such as MRU lists, English Dictionaries, etc.), the present invention allows for multiple prediction components called "prediction modules" to provide text predictions based on each prediction module's prediction method from which the best prediction may be displayed. For example, a "dictionary prediction module" may provide a prediction method which finds the most common word or words which complete the currently entered prefix, whereas a MRU list may provide a prediction list based on the most recently entered text that matches the input sequence. Thus, the best prediction from the results of the two methods may be displayed. Thus, the present invention allows multiple prediction modules to work together to efficiently produce predictions for presentation to the computer user.

One of the multiple prediction modules provided by the present invention enables text provided with a field of entry of one application to be utilized for text prediction in a different field of entry of another application. For example, an electronic mail (email) application might maintain a list of commonly used email names. This list can be installed into the system as a prediction module so that whenever the prefix to an email name is entered, the prediction module is able to predict the full name. Although this email prediction module would be primarily of use within the mail application, if another application has a text window where email names are commonly entered (such as an application for scheduling meetings), the prediction module manager will find that the email name prediction module has been successful at predicting text for these window scheduling programs. Thus, the prediction module manager will begin to use text predictions from the email name prediction module within that particular window of the scheduling program window. Therefore, a prediction module designed for primary use for one application is made available to other applications and may provide useful predictions.

In accordance with providing multiple predictions from various modules, the present invention provides a method for choosing which modules' predictions should be used from the set of possibly contradictory predictions. In the present invention, a "prediction module manager" keeps a record of the prediction success of each prediction module within each different application window where text is entered. Each prediction module produces a weighted list of predictions. The prediction module weights are based on the prediction modules' estimation of the probability that the completion text will be entered by the user. The prediction module manager then adjusts these weights based on the prior success of each prediction module in the current text input window of the particular application. The resulting best prediction or predictions with the greatest weights may then be presented to the user as default inputs.

A general problem in implementing an application-independent prediction system with a standard keyboard occurs because different applications use the keyboard and screen in different ways. For example, using the tab key to indicate that a prediction should be accepted may not work for all applications because existing applications may already use the tab key for another operation. However, in the preferred embodiment, the shift key is utilized as a text selection mechanism. The shift key is depressed to indicate that the proposed text should be entered as if it were typed in by the user. Utilizing the standard shift key alone as a text selection method provides a key that typically is not used alone by an application to produce a visible result on the display monitor. The shift key selection method is differentiated from normal use of the shift key for capitalization because no other key is depressed simultaneously with the shift key. Because applications, in general, do not use the shift key alone as a control signal, the shift key selection mechanism may be used for multiple applications without control signal conflicts with the multiple applications. Also, because of the conventional location of the shift key, the shift key may be typed easily without interfering with normal touch typing. Depressing the conventional "control" key without pressing another key simultaneously may also be used to select a new prediction in the same manner as the shift key.

Displaying predicted text on a monitor with input text can be a distraction to a computer user. In the preferred embodiment, the method for displaying predicted text is to show the prediction in light gray text following the characters already entered by the user. By using gray or a lighter shade of color of the input text for displaying the text prediction, a user may not be overly distracted by the text predictions during typing.

Another aspect of the present invention provides for efficient use of memory among the various prediction modules. The different prediction modules are able to efficiently access a common history of user input so that there is not wasteful duplication of history information between different prediction modules. A prediction module termed, "the information retrieval prediction module", is used to help efficiently store text in and retrieve text from a common input text history array. Rather than have each prediction module keep a separate history, each prediction module can make queries to the information retrieval prediction module to find and read locations in the history array. The information retrieval prediction module implements a "best match prediction" module that locates the longest sequence of characters duplicated in the history array that matches the input sequence. The information retrieval prediction module also implements a "most recently used" prediction module that finds the most recently entered match for the input text.

Generally described as part of the best match prediction module of the information retrieval module, the present invention also provides a method of locating text within a history array that has a search time that is independent of the length of the text history array. The present invention provides a text storing method that enables the present invention to quickly locate a match for the input character sequence, in the history array, for which a prediction is desired and displays, as the prediction, the characters following the most recent occurrence of the longest matched input character sequence up to the end of word following the matched sequence.

More particularly, the "best match prediction" module aids in storing text in a text history array in the order in which the characters are input by a computer user and stores, in a database, values that indicate the positions of various character sequences in the history array. As characters are being input and added to the history array, an address is calculated, preferably by a hash coding technique, that is representative of the current input character sequence and the position of the character sequence in the history array is stored at the database address calculated for the input character sequence.

Each time a new input character is entered, the database is queried, using the calculated address, to determine if a valid position for the history array has been stored at the calculated address. If a valid position for the text history array has been stored at the calculated database address, this indicates that the character sequence has previously occurred in the history array. If the character sequence has not previously occurred in the history array, then the position of the character sequence is stored in the database as discussed above. If the character sequence has previously occurred, the position of the current character sequence is stored in the database at the calculated address to replace the position that was previously stored in the database for the previous occurrence of the input sequence in the text history array.

Additionally, after the present invention locates the position in the text history array for which the current character sequence has most recently occurred, the adjacent preceding characters from the most recent occurrence position in the text history array are compared against the adjacent preceding characters of the current input characters to locate the character and the position at which the sequence does not match. A hash database address location is calculated for the non-matching sequence, and the position in the text history array of the non-matching sequence, which begins with the originally located sequence, is stored to the database at the address calculated for that sequence. By additionally updating the database to point to the longer character sequence which did not match all of the characters of the input sequence at the most recent occurrence position for the input sequence, the database is continually updated to point to multiple character sequences that begin with the same character or characters which enables direct addressing to quickly locate the different character sequences. By providing direct addressing to locate matching character sequences, the search time for providing a prediction based on matching characters in a history array is fast.

In order to provide a prediction for input characters based upon the history of text entered, the present invention calculates an address that is representative of the character sequence, preferably by a hash coding technique as discussed above. The database is queried using the calculated hash database address, and if the character sequence has previously occurred, the most recent position in the text history array of the character sequence will be returned. The word prediction system may then display the longest match of characters for the most recent occurrence up to the next word.

Thus, it is an object of the present invention to provide an efficient word prediction system.

It is also an object of the present invention to use a database to aid in searches through a text history array.

It is also an object of the present invention to quickly locate an address in the database that corresponds to the input character sequence.

It is also an object of the present invention to determine the longest match of input characters using a hash addressing scheme.

It is also an object of the present invention to provide a text prediction system that operates across multiple windows or field of entries of an operating system.

It is also an object of the present invention to provide multiple prediction methods or modules from which a displayed prediction may be selected.

It is also an object of the present invention to provide a method to weight the multiple predictions from the various prediction modules in order to aid in prediction selection.

It is also an object of the present invention to enable text to be predicted for a field of entry based on text entered in another field of entry.

It is also an object of the present invention to provide a method of displaying a text prediction.

It is also an object of the present invention to provide an easily operated text selection mechanism.

These and other objects, features, and advantages of the present invention will become apparent from reading the following description in conjunction with the accompanying drawings.

BRIEF DESCRIPTION OF THE DRAWINGS

FIG. 5 illustrates tables used in providing text predictions.

FIG. 6 illustrates a table used in providing a text prediction.

FIG. 7 illustrates a database and text history array utilized in the preferred embodiment of the present invention.

FIG. 9a illustrates a flow diagram of the steps implemented in a prediction module of the present invention.

FIG. 9b illustrates an alternate embodiment of the flow diagram of FIG. 9a.

FIG. 13 illustrates a table of hash values calculated for selected character sequences.

FIG. 14 illustrates a table of values of changes to the database as the database is being updated.

DETAILED DESCRIPTION

Figure 1:
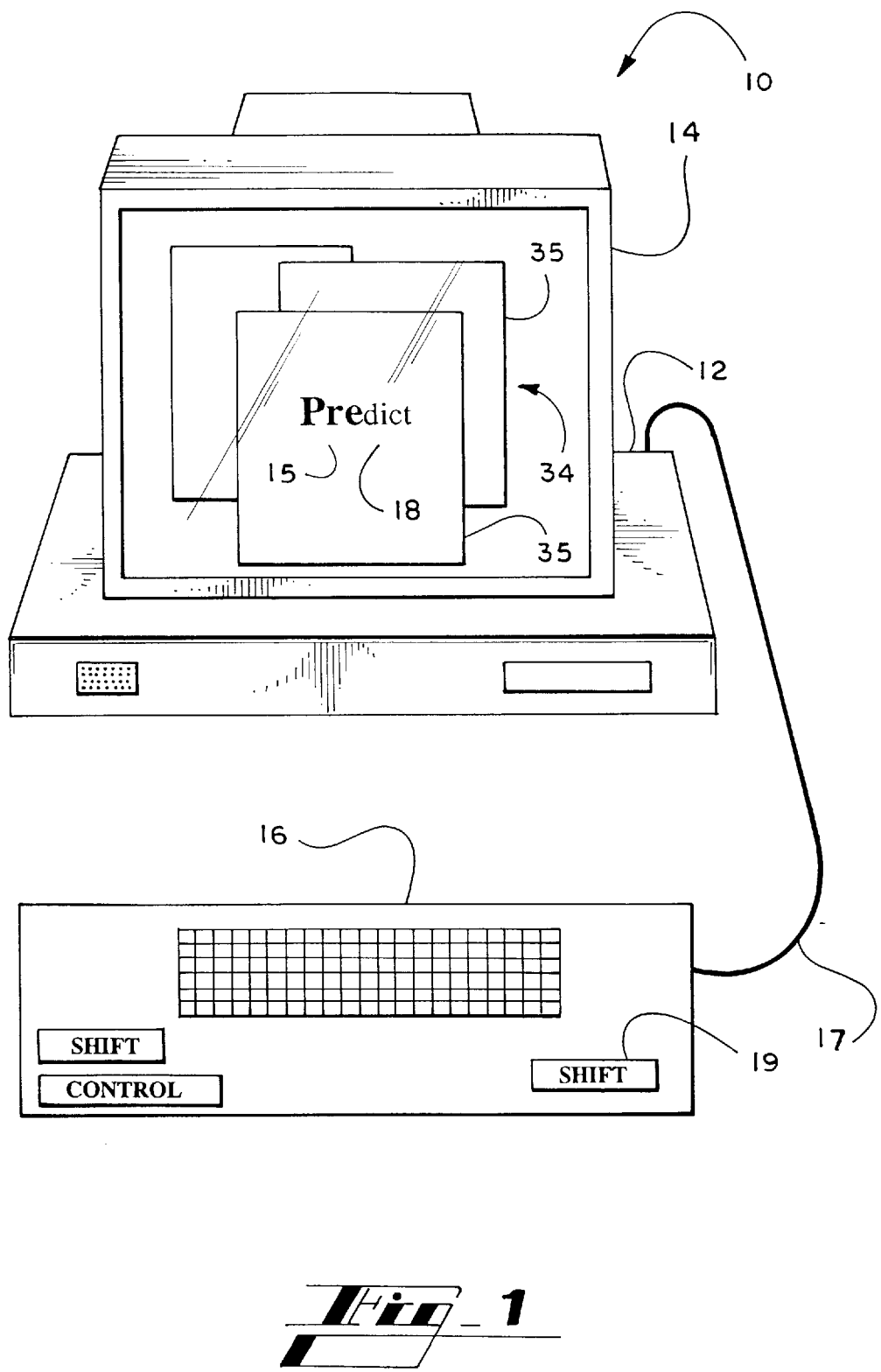
FIG. 1 illustrates the preferred embodiment of the word prediction system of the present invention.

Referring to the figures, in which like numerals refer to like parts throughout the several views, a word prediction system made according to the preferred embodiment of the present invention is shown. Referring to FIG. 1, a word prediction system 10 is implemented with a computer 12 connected to a display monitor 14. The computer 12 receives input data 15 from a conventional keypad 16 via an input line 17. It should be appreciated by those skilled in the art that text entry also may be accomplished by using a touchpad or input selection device in conjunction with software for recognizing input signals as a character selection. Shown in gray or a lighter shade of color than the input data 15 is the predicted text 18.

In the preferred embodiment, the predicted text 18 may be accepted when a user presses and releases the shift key 19 of the keypad. Because the pressing and releasing of a shift key without simultaneously pressing another key normally has no effect on an application, the shift key text selection method does not interfere with normal keypad input by the user.

With respect to first the nomenclature of the specification, the detailed description that follows is represented largely in terms of processes and symbolic representations of operations by conventional computer components, including a central processing unit (CPU) associated with a general purpose computer system, memory storage devices for the CPU, and connected pixel-oriented display devices. These operations include the manipulation of data bits by the CPU and the maintenance of these bits within data structures supplied by one or more the memory storage devices. Such data structures impose a physical organization upon the collection of data bits stored within computer memory and represent specific electrical or magnetic elements. These process descriptions and symbolic representations are the means used by those skilled in the art of computer programming and computer construction to most effectively convey teachings and discoveries to others skilled in the art.

For the purposes of this discussion, a module or process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files or the like. It is also conventional for such signals to be manipulated through the use of conventional computer programs as designed through conventional programming techniques. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. The operations described herein are machine operations performed in conjunction with a human operator or user that interacts with the computer. The machines used for performing the operation of the present invention, as will be understood, include general purpose digital computers or other similar computing devices.

Furthermore, it should be kept in mind that there is a distinction between the methods, steps, or operations completed by a computer, and the method of computation itself. The present invention relates to methods, processes, steps, or operations for a computer and the processing of electrical or other physical signals to generate desired physical signals and to display results and interactions.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Figure 2:
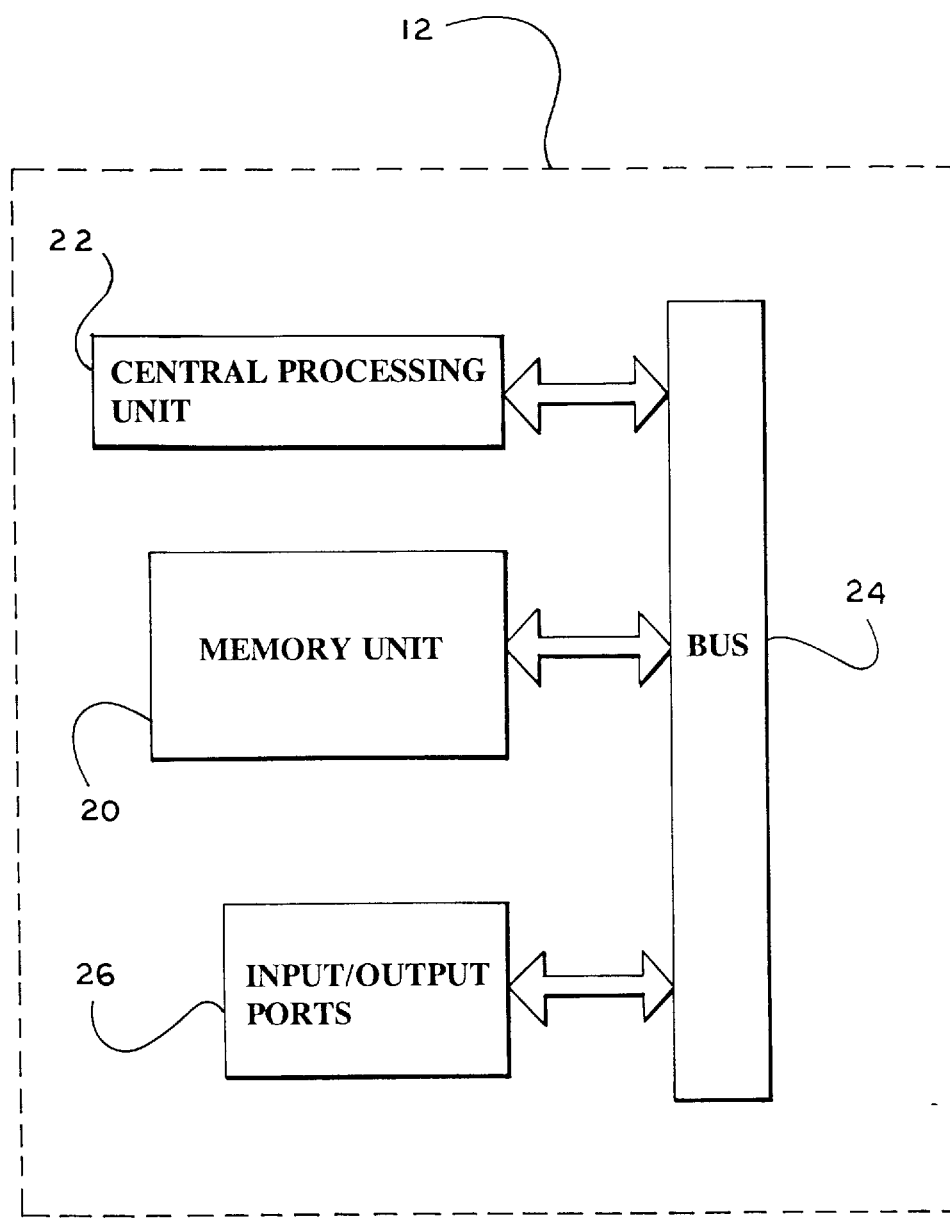
FIG. 2 illustrates some of the components associated with the computer utilized in the preferred embodiment of the present invention.

Referring to FIG. 2, the hardware components of the computer 12 that are utilized by the word prediction system 10 in accordance with the present invention are illustrated. For simplicity of the drawings, many components of a standard computer system have not been illustrated such as address buffers, memory buffers and other standard control circuits because these elements are well known and illustrated in the prior art and are not necessary for the understanding of the present invention. Computer programs used to implement the various steps of the present invention are generally located in the memory unit 20, and the processes of the present invention are carried out through the use of a central processing unit 22. The memory unit 20 and the central processing unit 22 are interconnected by a computer system bus 24 on which digital information is exchanged between computer system components. The data signals resulting from the processes implemented at the central processing unit 22 may be communicated along the computer system bus 24 to input/output ports 26, for transfer to display monitor 14 (FIG. 1). The display monitor 14 provides a visual display of input data 15 and the predicted text 18 generated from the processes implemented at the central processing unit 22.

Figure 3:
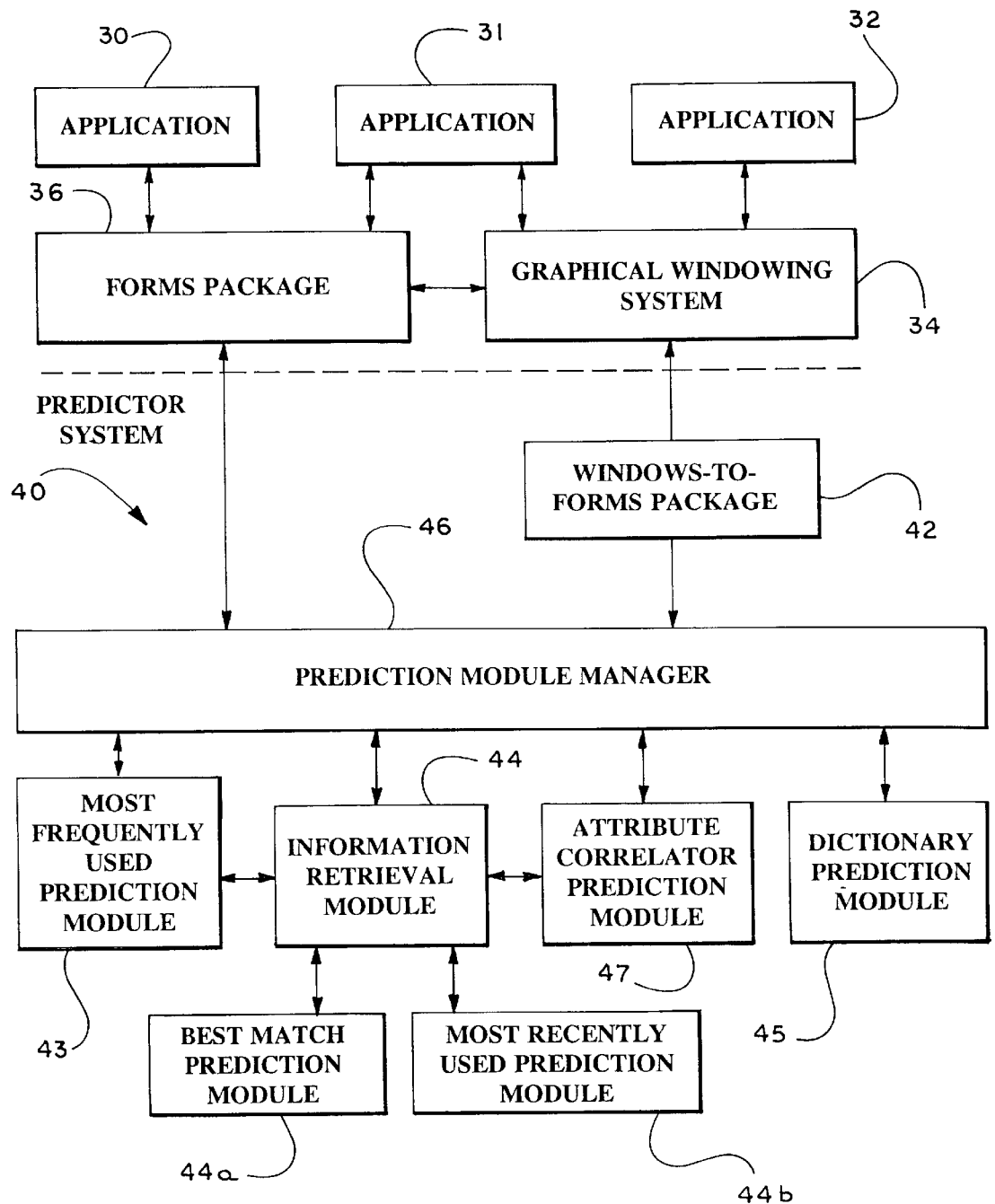
FIG. 3 illustrates the subsystems of a computer system that implements multiple windows and illustrates subsystems that may be implemented in the present invention.
Figure 4:
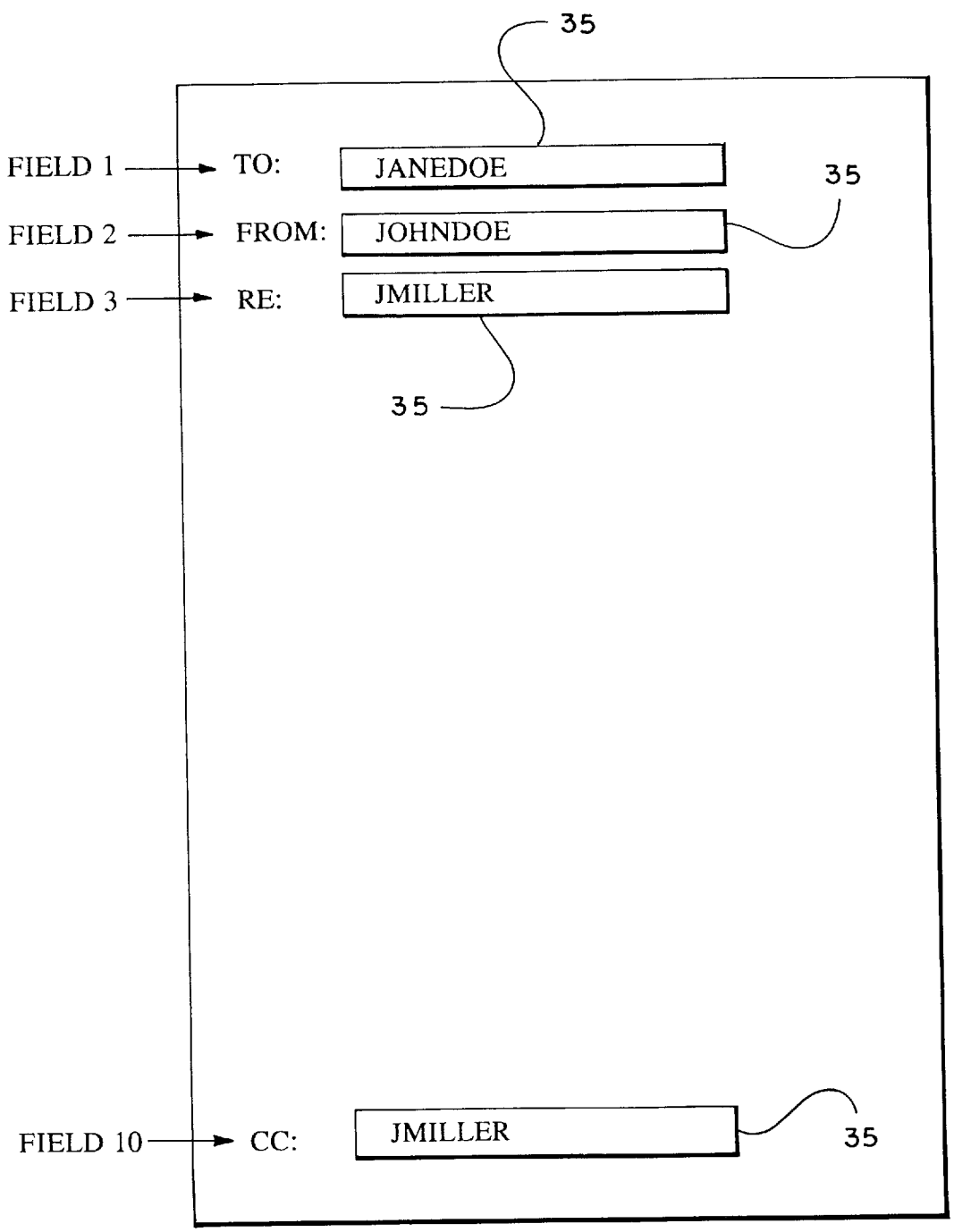
FIG. 4 illustrates multiple fields of entry for a computer application.

The following discussion of text entry in a windowing environment is given with reference to FIG. 1, FIG. 3, and FIG. 4 which shows a block diagram of the operative subsystems of a text entry system in a windowing environment. At any given time in the computer system, multiple applications 30, 31, and 32 may be running simultaneously. Generally, applications send data to a graphical windowing system 34 to display text and graphics on the monitor 14. When the user produces mouse or keyboard input, the graphical windowing system 34 sends this information to one of the applications. This application is said to have focus.

Rather than directly communicating with the windowing system 34, an application can instead communicate with a subsystem 36 generally known as a forms package or a dialog package. The forms package 36 is a set of procedures which handle the most common input-output interaction with the windowing system 34. For example, the application can call a procedure in the forms package that causes a window or field of entry 35 to be created which prompts the user for text input as shown in Fig. new 4. Because the forms package 36 is customized for the most common types of input tasks, the application can use a less complicated, higher level interface when communicating with the application 30 than is available to an application 32 calling the windowing system directly. The forms package 36 handles the low level details. For example, when a user types a "J" into a field of entry 35 within an application using the forms package 36, the forms package 36 receives notification of the keypad input from the windowing system 34 and signals to the windowing system to display the letter "J" in a specific location.

In addition to the subsystems of a general windowing system, multiple predictor subsystems 40 may be utilized by word prediction system 10 to produce the predicted text. The predictor subsystems 40 may be available to a forms package 36 to help provide text completion. Each of the subsystem modules 43, 44, 44a, 44b, 45 and 47 may provide text completion based on a different set of prediction rules. Within the limits of the memory resources on the computer system, a plurality of prediction modules can be installed into the prediction system. When a new prediction module is installed, a prediction module manager 46 is given an identifier by conventional programming techniques, as known by those skilled in the art, which specifies how a new prediction module is to be called. When a user inputs data, a forms package 36 may create a query to the prediction module manager 46 to present the current state of the user input.

Upon receiving the user input text, each prediction module provides a prediction based on its prediction technique. Along with each prediction by each prediction module, each prediction module may provide a "belief factor" that is an estimate of the likelihood that its prediction is correct. The belief factor is a number that increases with the increasing probability that a predicted word or the predicted text is correct. The manner in which the belief factor may be calculated for the various modules is discussed in more detail below.

The prediction module manager 46 provides the best prediction or predictions from the modules 43, 44, 44a, 44b, 45, and 47 to the windowing system for display. The form package 36 sends instructions to the windowing system 34 to display the predicted text in light gray type 18 in the location that the text would be written if entered by the computer user. If the computer user indicates that the prediction is correct, the forms package 36 darkens the predicted text and updates the state of the forms package 36 as if the user had typed in the full predicted text.

For applications which do not use forms package 36, text completion is accomplished using the lower level information available from the graphical windowing system 34. A windows-to-forms package 42, as referred to herein, is utilized for low level communications with the graphical windowing system 34 to provide text completion for applications that do not interact with a forms package 36. To the predictor subsystems 40, programming calls from the windows-to-forms package 42 are handled in the same manner as programming calls from the forms package 36. The windows-to-forms package 42 takes predictions and instructs the windowing system to display the prediction in the gray text 18. The windows-to-forms package 42 then monitors the keypad signals to determine if the user has indicated that the prediction is correct. When a user indicates that a prediction is correct, the windows-to-forms package 42 instructs the windowing system 34 to indicate to the application that the predicted text has been entered.

When a user inputs text data, the forms package seeks a prediction from the multiple prediction modules through the prediction module manager 46. The prediction module manager 46 receives the results of the predictions from each prediction module and returns the best predictions to the forms package 36. As discussed in more detail below, the forms package 36 maintains a list that indicates the number of correct predictions received from each prediction module within the current field of entry, such as fields 1–10 illustrated in FIG. 4. The correct prediction list information is used with the "belief factor" returned by the prediction modules to create an "adjusted belief factor." The adjusted belief factor provides an adjusted calculation of the probability that a prediction from a particular prediction module is correct for the current field of entry. The predictions are then returned to the forms package 36 in order of decreasing adjusted belief factor. A list of the predictions may be displayed to the user or only the best prediction may be displayed.

As noted above, multiple prediction modules may be provided. For example, prediction modules that may be provided include: a most frequently used prediction module 43 which may provide a list of the most frequently used words beginning with the input text; an information retrieval prediction module 44 that includes an array of input text that has been entered, a best match prediction module 44a that locates the longest match in the text history array, and a most recently used prediction module 44b that locates the most recently used word that matches the input text; a dictionary prediction module 45 that contains an ordered and generally unchanging set of words; and an attribute correlator module 47 that searches other fields of entry with the current input text and determines which of the other fields contain words that can provide the best predictions for the current field. It should be appreciated by those skilled in the art that other types of prediction modules may be provided and that the prediction modules discussed herein are illustrative of the types that may be provided. The belief factors for each of the prediction modules may be calculated in different ways depending on the nature and basis of the prediction method utilized by the module. The operation of the various prediction modules are discussed below.

The information retrieval module 44 maintains a text history array and accesses the best match prediction module 44a to provide predicted text based on the longest match for the current input text in the text history array. Additionally, the information retrieval module 44 accesses the most recently used prediction module 44b to provide the most recently used word that matches the input sequence. For example, if a field of entry prompts the user for a filename and the user has entered "re" and the most recent files names were (in order) "rope report2 real rhymes" then the prediction is "report2" for the best match prediction module 44a and the prediction is "real" for the most recently used prediction module 44b. Similarly, if the previous entry was "this is a test" and the current input is "another te", then the best match prediction module 44a of the information retrieval module 44 will predict "test" as the word being entered. Preferably, successive predictions will give the best prediction available excluding any predictions previously generated by the same query to the information retrieval module 44.

Because the information retrieval module 44 keeps a history of the user text input, the other prediction modules do not need to keep duplicate copies of the history of user input. Instead, the other prediction modules can query the information retrieval module 44 directly to determine what has been typed in the past. To make the information retrieval module 44 more useful for other modules, the information retrieval module 44 can be queried for matches within any field of entry from any form, not just the field of entry which is the subject of the current query. By providing a commonly accessible the common text history array, each module does not have to store a separate text history array and therefore memory can be saved.

As noted above, each prediction module provides a belief factor with each prediction. For the best match prediction module 44a, the belief factor returned with the prediction is the number of characters matched, as long as a full word is matched. For the most recently used prediction module 44b, the belief factor returned with the prediction equals 1+1/(the distance back in the text history array the match occurred). The distance back in the text history array that the match occurs can be determined by counting the number of characters (or bytes) or words back from the last character input in the text history array.

Unlike the information retrieval module 44, the dictionary prediction module 45 does not change over time with user input. The dictionary prediction module 45 simply looks up the current input text in a dictionary and finds all the words for which the current input is a prefix. The dictionary prediction module 45 then orders these words by a frequency (or probability) stored with each word. The resulting word list is returned to the prediction module manager 46 in sorted order with belief factors for the set of words returned.

The dictionary and the belief factors for the dictionary module 45 can be created by taking a large corpus of documents of text related to the type of dictionary being provided and counting the number of times each word appeared in the text then storing the frequency count as the belief factor with each corresponding word. It should be appreciated that words not in the corpus of documents can be additionally included and certain words that appeared in the corpus of documents may be removed. Preferably, the dictionary is compressed along with the log-base two of the number of times that each word appeared in the corpus. For example, if a word occurred 700 times, the number nine is stored as the frequency count for that word since 700 occurs between $2^9$=512 and $2_{10}$=1024. Thus, the result is a set of words with a general estimate of their frequency.

As noted above, the "most frequently used" prediction module 45 tracks the number of times the most common text values have been typed into the current field of entry or window. The probabilities or belief factors for these words may be calculated by dividing the number of times that the predicted word appeared in a given context by the total number of words that occurred in the given context.

Also, as noted above, the present invention also contains an attribute correlator prediction module 47. The purpose of the attribute correlator prediction module 47 is to find other fields of entry 35 where the current input text might have been recently entered. The attribute correlator prediction module 47 accesses or calls the best match prediction module 44a to search other fields of entry 35 with the current input text. Within the attribute correlator prediction module 47, the best match prediction module 44a is used to return a prediction as if the current text had been typed in a field of entry other than the current field of entry. The attribute correlator prediction module 47 is useful because often it is the case that the current input text or word has never been typed in the current field, although it has been typed in another field. For example, referring to FIG. 4, if "JMILLER" is entered in the "RE:" field of a mailing program, and subsequently "JM" is entered in the "CC:" field of the same program, the attribute correlator will be able to predict "JMILLER" in the "CC:" field even though "JMILLER" has not previously been entered in the "CC:" field.

Referring to FIG. 5, the attribute correlator prediction module 47 uses two list of information in association with its method of prediction. A "recent field use" list 61 of a preselected number of the most recently used field identification numbers (i.d.'s) is accessed and maintained by the attribute correlator 47. When the field of entry 35 (FIG. 4) is changed by a user, the new field of entry 35 moved into is recorded in the recent field use list 61. Every time a word is entered in a field of entry 35, the most recently used field i.d. numbers are accessed from the recent field use list 61. For each field i.d. in the recent field use list 61, the best match prediction module 44a provides a prediction. The field returning the highest belief factor is stored and associated with the current field i.d. as the second field i.d in a "best prediction field pair" list 63. These second field i.d. of field i.d. pairs of the pair represents the i.d. of the field that generally provides the best prediction for the current field.

When the attribute correlator prediction module 47 is queried for a prediction, the "best prediction field pair" list 63 is accessed to find the most recent pair that has the current field i.d. as the first field i.d. of pair. The best match prediction module 44a is then queried with the second i.d. of the located pair. The prediction returned using the second i.d. of pair is returned as the prediction for the attribute correlator prediction module 44a. In an alternative embodiment, rather than using the most recent pair, the attribute correlator prediction module 47 may locate from the best prediction field pairs in the list 63 with the selected field i.d. and may query the best match prediction module 44a with the second i.d. in the pair which occurred most frequently in the list. Additionally, if there is no prediction returned by the best match prediction module 44a, the second most recent pair or second most frequent pair could be searched with the current first i.d. depending of the embodiment implemented.

In addition to the modules discussed above, additional modules may evaluate information available on the computer system. For example, a filename module may evaluate the names of the files and directories available on the computer system even if the filenames had never been typed into a field of entry of form.

Because multiple predictions are returned for a given set of text or characters, the word prediction system uses a reweighting process to determine which prediction from the multiple prediction modules provides the best prediction for the current field of entry. The reweighting process of returned predictions from the prediction modules are based on prior learning or a prior record of which prediction modules returned predictions that were accepted by a user in the current field of entry. The acceptance of a prediction by user is considered as a successful prediction.

The preferred reweighting process, which determines which prediction to use from the multiple predictions, implements the following steps:

$$W=(N/(N+1))*(S/N)+(1/(N+1))*BF$$

where W is the corrected or reweighted belief factor; BF is the belief factor returned by the expert; S is the number of successful predictions that have occured within a predetermined range that the returned belief factor for the current field of entry falls within; and N is the total number of times that returned belief factors for the current field of entry have fallen within the same range. Preferably, the predetermined range of values used in determining the number of successful predictions, S, and the total number of attempts, N, within the predetermined range values are values separated by the powers of two from −R to +R. For example, the range of values using R=5 would be: $\frac{1}{32}$, $\frac{1}{16}$, $\frac{1}{8}$, $\frac{1}{4}$, $\frac{1}{2}$, 1, 2, 4, 8, 16, 32. An example calculation of the corrected weight is as follows. If the BF returned by the prediction module is 5 (BF=5) and there were S=2 prior successful attempts and 6 failures, out of N=8 tries with belief factors between 4 and 8 (the range that BF=5 falls in) then the adjusted weight or belief factor is W=($\frac{8}{9}$) * ($\frac{2}{8}$)+($\frac{1}{9}$) * 5=0.777. Note that as N increases, W approaches S/N. FIG. 6 illustrates a table or list of prediction successes of prediction attempts within a given range.

As noted above, the information retrieval module 44 maintains a history array of characters that have been previously entered. Because many characters and combinations of characters may be repeated in a text history array, searches through a history array using conventional search methods, as discussed above, may be unacceptable for certain applications. To help reduce the time required for searching through a text history array, the present invention provides an indexing or addressing scheme to provide for fast searches.

Depending on the application for which the prediction system is used, the method of displaying a text prediction may vary. As noted above, a text prediction may be displayed as the predicted completion immediately following the input text 15. When the predicted text immediately follows the input text, the forms package 36 displays, as the prediction, the text that has the highest prediction weight among the prediction weights returned with each text prediction from the prediction modules.

Alternatively or in addition to displaying text at the end of the input text, the predictions may be stored to a prediction list. The prediction list may be displayed to the user in the form of a graphical pull-down menu. The predictions are preferably arranged in order with the most likely text prediction appearing first in the displayed list followed by the second most likely prediction and so on to the least likely text prediction. The ordering of the prediction list is preferably based on the calculated weights for each text prediction.

Referring to FIG. 7, a general block diagram of a database indexing or addressing process is shown which is used to implement fast searching of a text history array 54 in information retrieval module 44. As part of the process when text is input, the text history array 54 is updated in sequential order to indicate the appropriate text history as shown. A database 50 contains address locations 52, for example, 0 through n, that have values that point to the positions of various character sequences found in the text history array 54. It should be appreciated that the term character sequence, as used herein, may refer to a single character or multiple characters. When the text history array 54 becomes full (i.e. the last byte of the text history array is filled), new input characters are stored starting at the beginning of the text array history 54 and thus overwrite any previous input characters in the order that the characters where input. This type of array may be termed circular.

As noted above, a hashing technique is used to aid in searching for an appropriate match. In database management, hashing may be described as an indexing technique in which the value of a key (a character sequence as used herein) operates as a record identifier, and the key is numerically manipulated to directly calculate either the location of its associated record in a file or the location of the starting point for a search for the associated record. If the key value is a character string, each possible character is assigned a numeric code to permit the numerical manipulation. The manipulation performed on the key is known as the hashing function, for example, assume two keys, CAT and MOUSE. If the characters in these words are assigned numeric values by totaling the ASCII values of the letters, a formula, or hashing function, could be created that might calculate a value of 1000 for CAT and a value of 1800 for MOUSE. Based on these values, record 1000 would contain the key value CAT and record 1800 would contain the key value MOUSE.

By utilizing hashing, the input character sequence 56 does not have to be stored along with the record. Instead, when the hash is performed on the character sequence, the numeric value determined is used as the address into the database 50. The address value provided from the hashing function on the character sequence is preferably a pseudo random number. Generally, the pseudo random number may be generated by multiplying the ASCII value of the first letter of the key by a large number to obtain a product that is divided by another large number to obtain a remainder. The remainder is the pseudo random number of the hashing function.

If the character sequence contains more than one character, the value of the pseudo random number may be determined as follows. The pseudo random number from the first hash operation is multiplied by the ASCII value of the second character to obtain a product that is divided by the same large divisor from the previous hash operation to obtain a remainder. The remainder from the second hash operation is the pseudo random number for the two character sequence. The process may be repeated for each subsequent character of the character sequence.

The preferable hash function of the preferred embodiment of the present invention accepts two variables: a character c and a "seed" value. The hash function utilized to obtain an address location in the database 50 in the preferred embodiment of the present invention is:

$$\text{hash}(c, \text{seed}) = ((c + \text{constant } X) \times (\text{seed} + \text{constant } Y)) \text{ modulo constant } Z)$$

where the seed value equals zero for the last character of a character sequence and where the seed of each of the other characters of the string equals the value that the hash function returned from the hash operation on the subsequent character of the string. Modulo is a function that performs a division operation and returns the remainder of the division operation. For example, the value for the hash string "sel" equals hash ('s', hash ('e', hash '1', 0)). The hash process is repeated for each subsequent character of the sequence until all the characters of the character sequence have been operated upon to provide an appropriate pseudo random number for the entire character sequence. Generally, different character sequences will produce different pseudo random numbers for different character sequences.

The resulting hash number is not truly a random number because the process will produce the same pseudo random number given the same input character sequence 56. Therefore, the same input character sequence 56 will be able to access the same address. The deterministic random nature of the hashing function helps to save storage space because the input character sequence 56 does not have to be stored with an associated value. By utilizing a hashing function with respect to various input character sequences 56, longer input character sequences in the text history array 54 beginning with the input character sequences can be found in an efficient manner.

In the preferred embodiment of the present invention, a hash function is performed on the input character sequence 56 to obtain an address location 52 of the database 50. The address location 52 contains a record that is a pointer to a position in the text history array 54 of the most recent occurrence of the current input character sequence. If the character or character sequence has not occurred in the text history array 54, the position of that input character or input character sequence 46 is stored as the record or pointer to the character sequence of the history array 54. If a character sequence has been found within the text history array 54, additional hash operations are performed to locate the longest match of characters corresponding to the characters preceding the input character sequence 56. The position of the longest match of characters that correspond to the input character sequence 56 is returned.

Because the address space available for the database to occupy is finite and the number of potential character sequences or keys is infinite, a problem may arise where multiple keys of the hashed character sequence map to the same address. The mapping of input character sequences 56 to the same address is termed a collision problem. In order to accommodate or lessen the problem of collisions of a particular address location, a bin, as known to those skilled in the art, is utilized at the address locations 52. A bin stores multiple records at that one address.

Because it is possible that different text values yield the same calculated database address, the input characters are compared to the text pointed to by the first record in the bin. If the input characters do not match characters associated with the first record then the text value pointed to by the next record in the bin is compared to determine if the characters match or until all records within the bin have been checked.

Another way to distinguish text sequences which generate the same address is to calculate "signatures" with this method, in addition to the pseudo random number generated to identify the address, another pseudo random number called a "signature" can also be calculated for each key. As known to those skilled in the art, a signature is usually selected or calculated to contain fewer bytes than the actual bit representation of the pseudo random number generated as the key or address for the character sequence. Although the addresses may be the same for a particular key, the signature for those keys that provide the same address may be calculated to be different. By providing signatures for input character sequences, four different input character sequences may map to the same address location 52 and still be distinguished. Thus, when a hash function is performed on an input character sequence, the address corresponding to the input character sequence is located, then the bin is searched for the corresponding calculated signature. As noted above, the record points to a position in the text history array 54 that corresponds to the input character or input character sequence being evaluated.

In summary, to determine whether or not a character sequence has occurred within the text history array 54, a hash operation is performed on an input character sequence which yields an address. At the address location, a determination is made whether characters have a match in the bin. If there is a match, the record points to the location in the text history array 54 of the corresponding input character sequence. If no match is found in the bin, then there is no match for this input character sequence, and the record is set to point to the new input characters in the array. If a bin is full and the current record pointed to the character sequence is to be written in the bin, the oldest record is replaced by the current record.

In connection with the text prediction, the present invention utilizes a selection device that is not likely to be used by the various windows in which the word predictor system operates. Referring to FIG. 1, the shift key 19 is illustrated and operates according to the present invention to designate selection of a word prediction. The shift key is unlike many other keys because the shift key 19 must normally be pressed simultaneously with another keypad input to produce a visible effect on the display monitor 14. Also the "control" key of a conventional keyboard may be used as the text selection method. Therefore, by utilizing the shift key 19 or control key as the text selector for predictions, it is less likely that a window or application would have an operation that responds only to the pressing and releasing of the shift key 19. In this manner, the text selection mechanism of the word predictor is easy to access and is not likely to interfere with designated input operations allocated to specific keys on the keypad.

Figure 8:
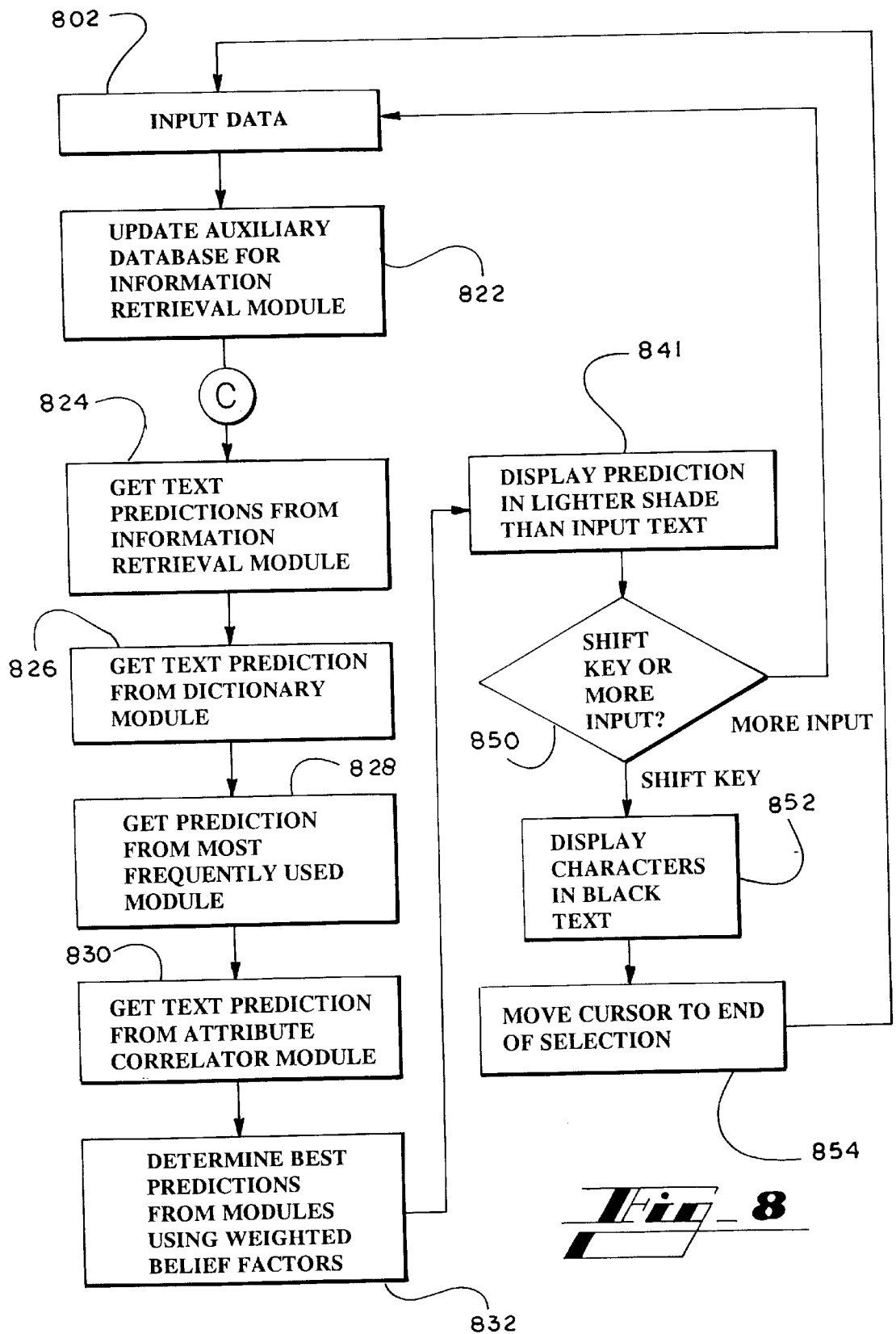
FIG. 8 illustrates a general flow diagram of the preferred steps implemented in the preferred embodiment of the present invention.

Referring now to FIG. 8, a flow diagram illustrating the preferred steps of the method of the present invention is illustrated. FIG. 8 will be discussed in connection with FIGS. 1 and 3. At step 802, input data is received from keypad input from a computer user. At step 822, the information retrieval module 44 is called by the prediction module manager 45 and the input data is added to the history array 54. The information retrieval module 44 updates, as discussed in connection with FIG. 7 and 11, the database 50 to point to the most recent occurrence of the input character sequence. The process then proceeds to step 824 where the information retrieval module 44 provides its text prediction based on the best match for the input character sequence or the most recently used match. The process then proceeds to step 826 where the dictionary prediction module 46 provides its text prediction, as discussed above, for the input data. At step 828, the prediction module manager 46 calls the most frequently used prediction module 43 to provide its text prediction for the current input data. At step 830, the attribute correlator is accessed for its text prediction. At step 832, after each module has provided its prediction, the prediction module manager 46 determines the best prediction as discussed above.

The process then proceeds to step 841 where the character prediction is displayed in gray text following the black text of the input character sequence. At step 850, the user of the system has an option of pressing and releasing the shift key 19, without pressing another input key simultaneously, to accept the word prediction or inputting another character. If the user presses and releases the shift key 19 at step 850, the process proceeds to step 852 where the characters that were previously displayed in gray text are now displayed in black as though the characters were input directly by the user. At step 854, the cursor is moved to the end of the characters accepted by the user. The process may then proceed to step 802 where the prediction process of the preferred embodiment of the present invention is repeated as described above.

Referring to FIG. 9a, the processes and steps implemented in the present invention for providing a text prediction from the attribute correlator are illustrated. FIG. 9a is discussed in conjunction with FIGS. 3 and 5. At step 902, when the field of entry is changed by a user, the field of entry moved into is recorded in the most recently used fields list 61. At step 904, the most recently used field i.d. numbers are accessed from the "recent field use" list 61. At step 906, for each field i.d. in the "recent field use" list 61, the best match prediction module 44a provides a prediction. At step 908, the field returning the highest belief factor is returned. The process then proceeds to step 910. At step 910, the field returning the highest belief factor is stored and associated with the current field i.d. as the second field i.d in a "best prediction field pair" list 63 of field i.d. pairs. These second field i.d. of the pair represents the i.d. of the field that generally provides the best prediction for the current field. The process then proceeds to step 912.

At step 912, when the attribute correlator prediction module 47 is queried for a prediction, the "best prediction field pair" list 63 is accessed to find the most recent pair that has the current field i.d. as the first field i.d. of pair. At step 914, the best match prediction module 44a is then queried with the second i.d. of the located pair. At step 916, if no match is found with the initial query, another pair that has begins with the current i.d. is queried for prediction until the list is exhausted. At step 918, the prediction returned using the second i.d. of pair is returned as the prediction for the attribute correlator prediction module 44a.

Figure 9B:
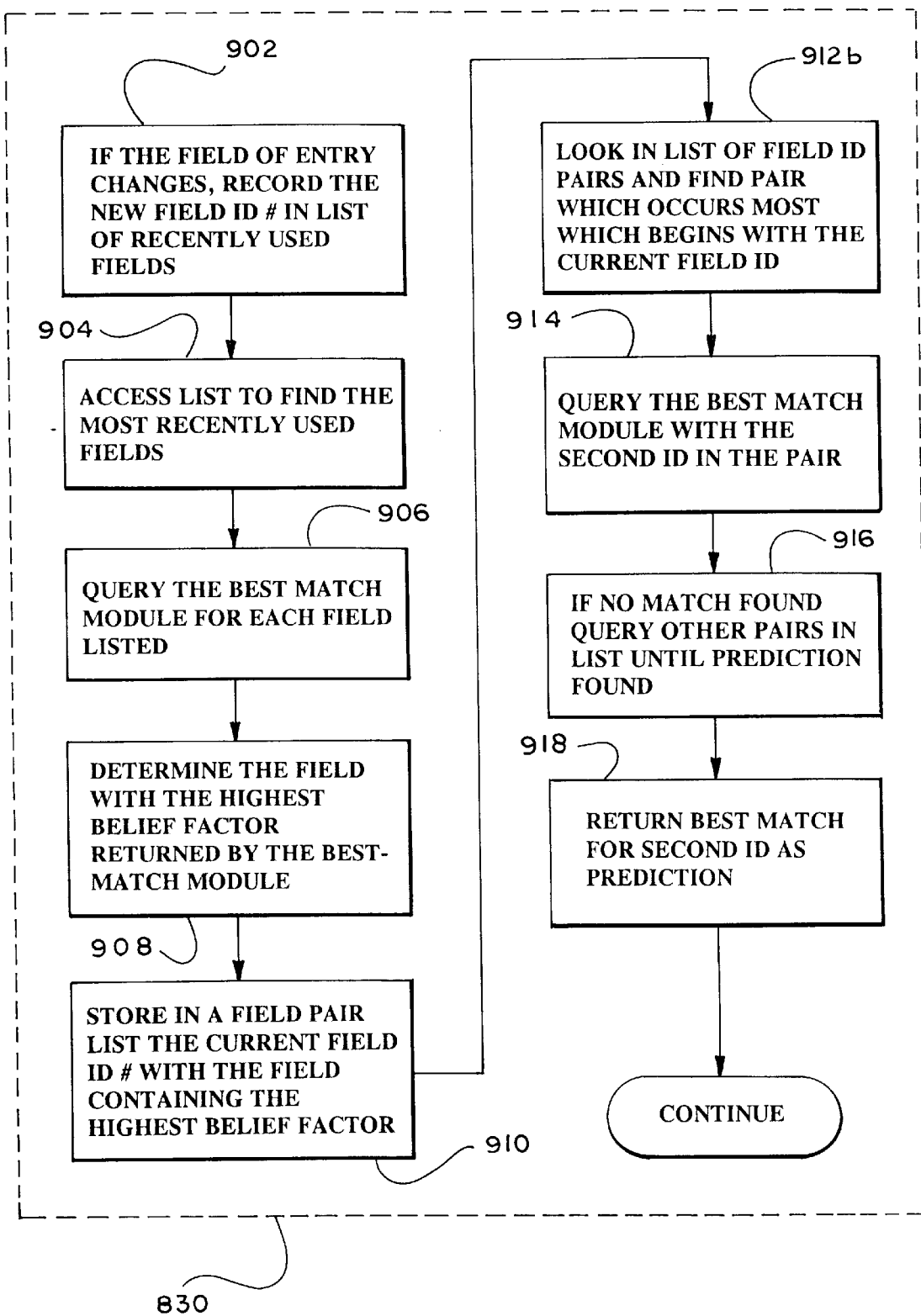

Referring to FIG. 9b, an alternate process for the attribute correlator 47 of the present invention is shown. The steps implemented in FIG. 9b correspond to the steps implemented in FIG. 9a except that instead of searching the i.d. pair that most recently occurs with the current i.d., the i.d. pair that occurs most which begins with the current field i.d. is searched. In the process illustrated in FIG. 9b, step 912b of replaces step 912 of FIG. 9a.

Figure 10:
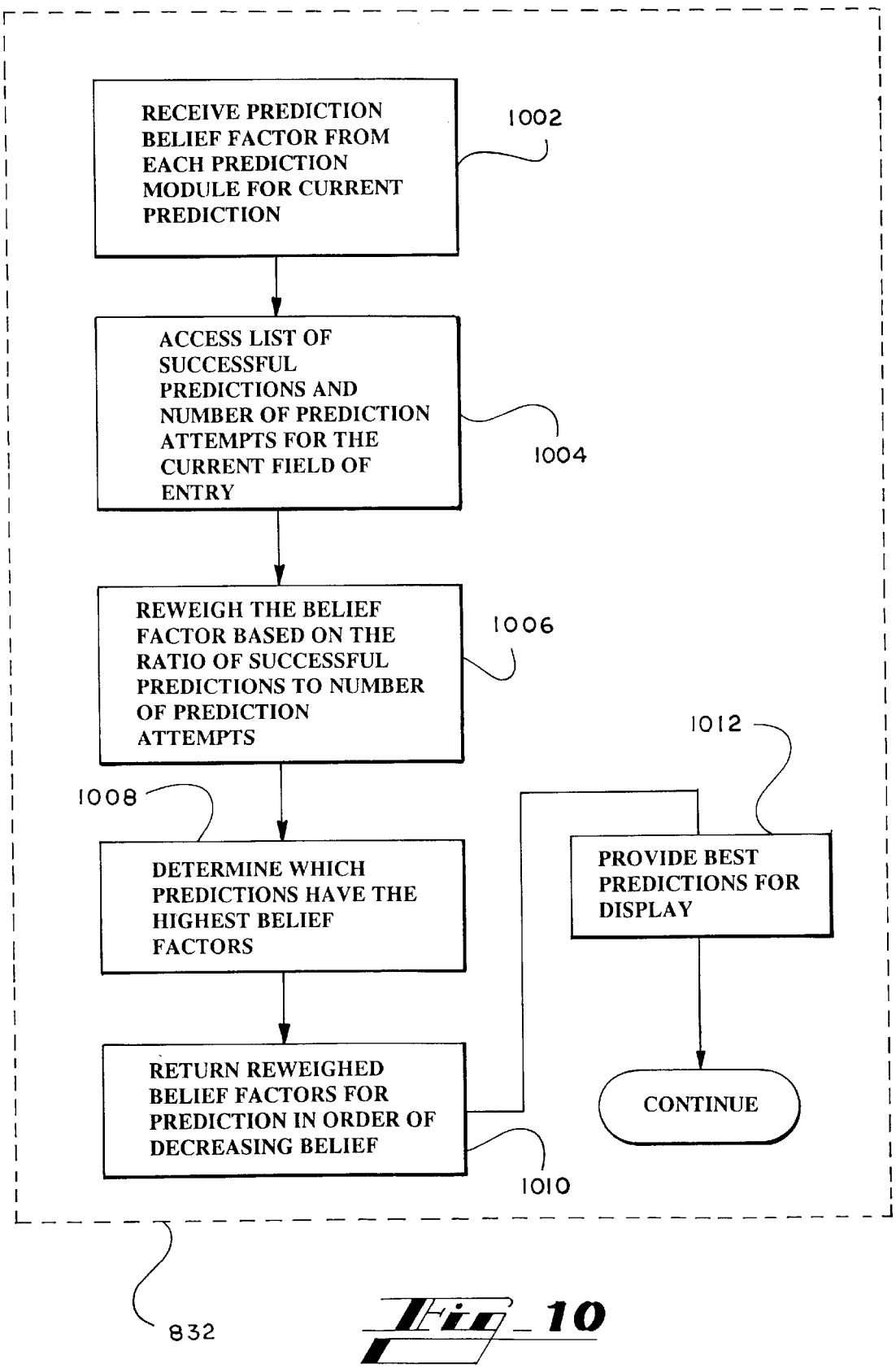
FIG. 10 illustrates a flow diagram of the steps utilized in selecting a text prediction.

As noted above, the present invention provides a reweighting process for the belief factors returned by the prediction modules. The reweighting process is an adjusted calculation of the probability that a prediction from a particular prediction module is correct for the current field of entry. Referring to FIG. 10, the reweighting process of the present invention is illustrated. At step 1002, the predictions are received from each prediction module. At step 1004, the list 67 (FIG. 6) of the number of successful predictions and the number of prediction attempts for the current field of entry is accessed. The process then proceeds to step 1006 where the process reweights the belief factors based on the ratio of successful predictions to the number of predictions attempts for the current field of entry. At step 1008, the predictions having the highest belief factors are determined and, at step 1010, the prediction having the highest reweighted belief factors are returned in order of decreasing belief. At step 1012, the best prediction or predictions are provided for display.

Figure 11:
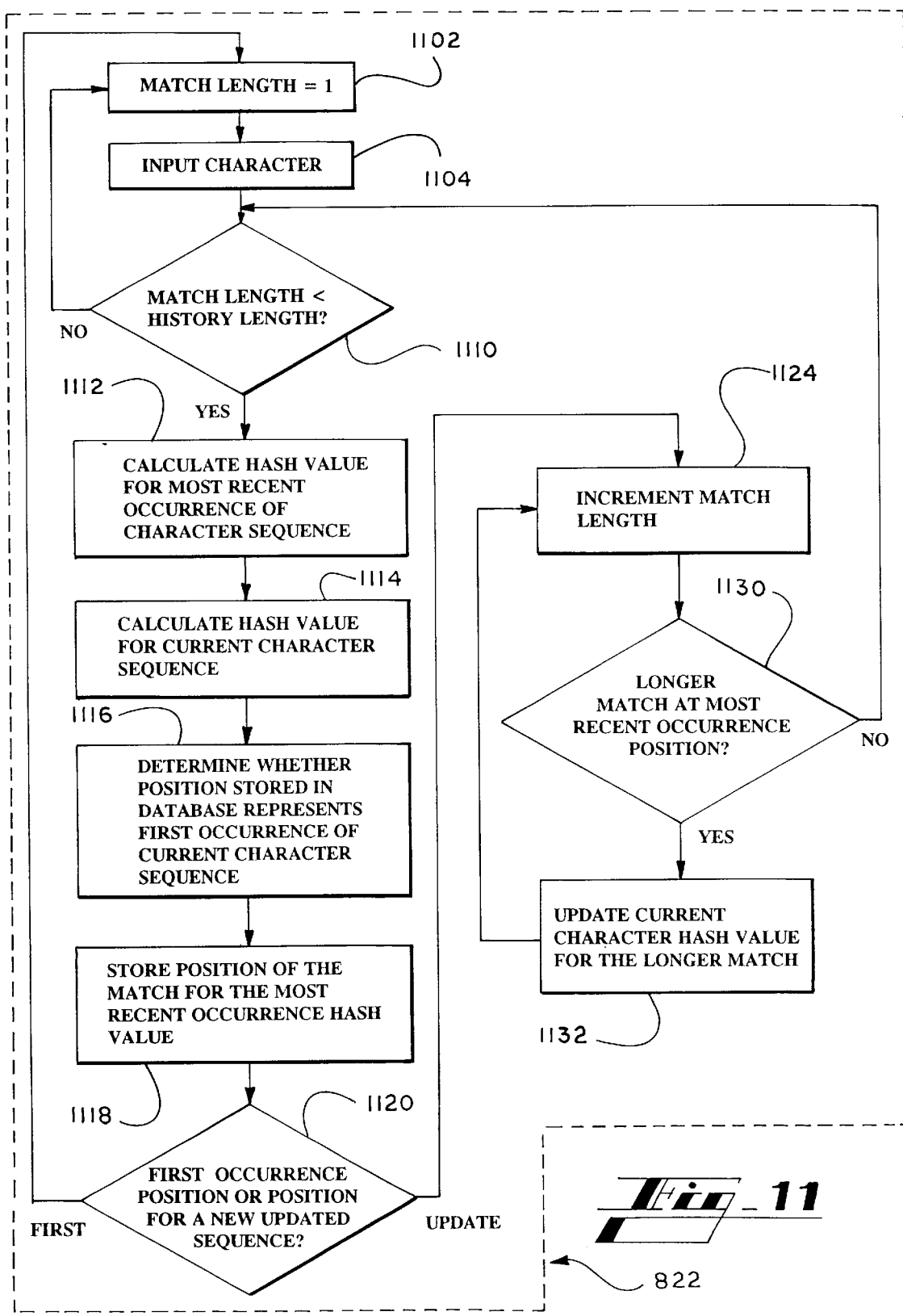
FIG. 11 illustrates a flow diagram of the hashing functions used in the preferred embodiment of the present invention to update a database of character positions.

Referring to FIG. 11, the processes implemented in the preferred embodiment of the present invention for updating the database 50 to point to character sequences in the text history array 54 is shown. Before any text processing has occurred, the database is initialized to values (invalid positions) that are not contained in the history array 54, such a negative position value. At step 1102, a variable match length, length, is set to 1. The match length variable provides a count for the number of characters that match the current character sequence as compared to the most recent occurrence of the character sequence in the history array 54. At step 1104, the input character sequence is provided by a computer user. At step 1110, a determination is made as to whether the match length is less than the history length. If the match length is not less than the history length, then at step 1110 the process returns to step 1102. If, however, at step 1110, the match length is not less the length of the history array then the process proceeds to step 1112 where the hash value is calculated for the most recent occurrence of the character sequence. As noted above, the hash value is determined according to the hash equation (1). The character c of the hash function (1) may be represented by h[x], where h is the history array 54 and x represents a position variable for a character in the history array 54, so that h[x] represents the character in the history array 54 at position x. The hash function implemented to calculate the most recent occurrence hash value (MROHV) is:

$$MROHV = Hash(h[posMRO - mlength], CCHV) \qquad (2)$$

where posMRO is the position number of the most recent occurrence of the character sequence and the seed, CCHV, is the current character sequence hash value. When the input character is first received at step 1104 the CCHV value is set to zero and posMRO is set to equal the length of the history array. Also, if the character sequence has not previously occurred, the MROHV value is also the hash value for the current sequence. After the hash value is calculated for the most recent occurrence of the character sequence, the hash value for the current character sequence is calculated at step 1114. The hash function implemented to calculate the hash value for the current character sequence is:

$$CCHV = Hash(h[hlength - mlength], CCHV) \qquad (3)$$

where hlength is the length of the history array (i.e. the number of characters in the history array). The process then proceeds to step 1116.

At step 1116, the database is accessed to get the history array position value for the current character sequence hash value CCHV. An invalid position will be returned at step 1116 if the character sequence has not occurred (i.e., the first occurrence of the character sequence in the history array) or valid position, if the sequence is located in the history array, will be returned at step 1116. The process then proceeds to step 1118 where the position of the match for the most recent occurrence of the character sequence is stored in the database at the MROHV location of the database. By storing this occurrence of the character sequence, subsequent accesses of the database using the hash value for the sequence will point to the most recent occurrence position in the history array. At step 1120, a determination is made as to whether the stored database position obtained from step 1116 is the first occurrence of the character sequence (i.e., an invalid position). If the position is valid then the character sequence has been previously input in the history array and thus a valid position pointer for history array is stored at the CCHV location in the database.

If, at step 1120, the position is not valid and thus is the first occurrence of character sequence then the process returns to step 1102 where processing may begin for an additional input character as discussed above. If, however, the position stored for the current character sequence has occurred in the history array then the process proceeds to step 1124 where further processing of the current sequence will yield an updated database value to point to a longer non-matching sequence that occurred prior to the current sequence but which begins with currently processed character sequence.

At step 1124, the match length, mlength, is incremented by 1. At step 1130, the next character looking back mlength characters from the current character sequence in the history array is compared to the character at the most recent occurrence position looking back in the history array mlength characters. If the character at the most recent occurrence position matches looking back in the history array mlength characters, then the current character hash value CCHV is updated according to the hash function (3) above. The process then proceeds to step 1124. If, at step 1130, the character at the most recent occurrence position did not match looking back in the history array mlength characters, the process proceeds to step 1110.

Figure 12:
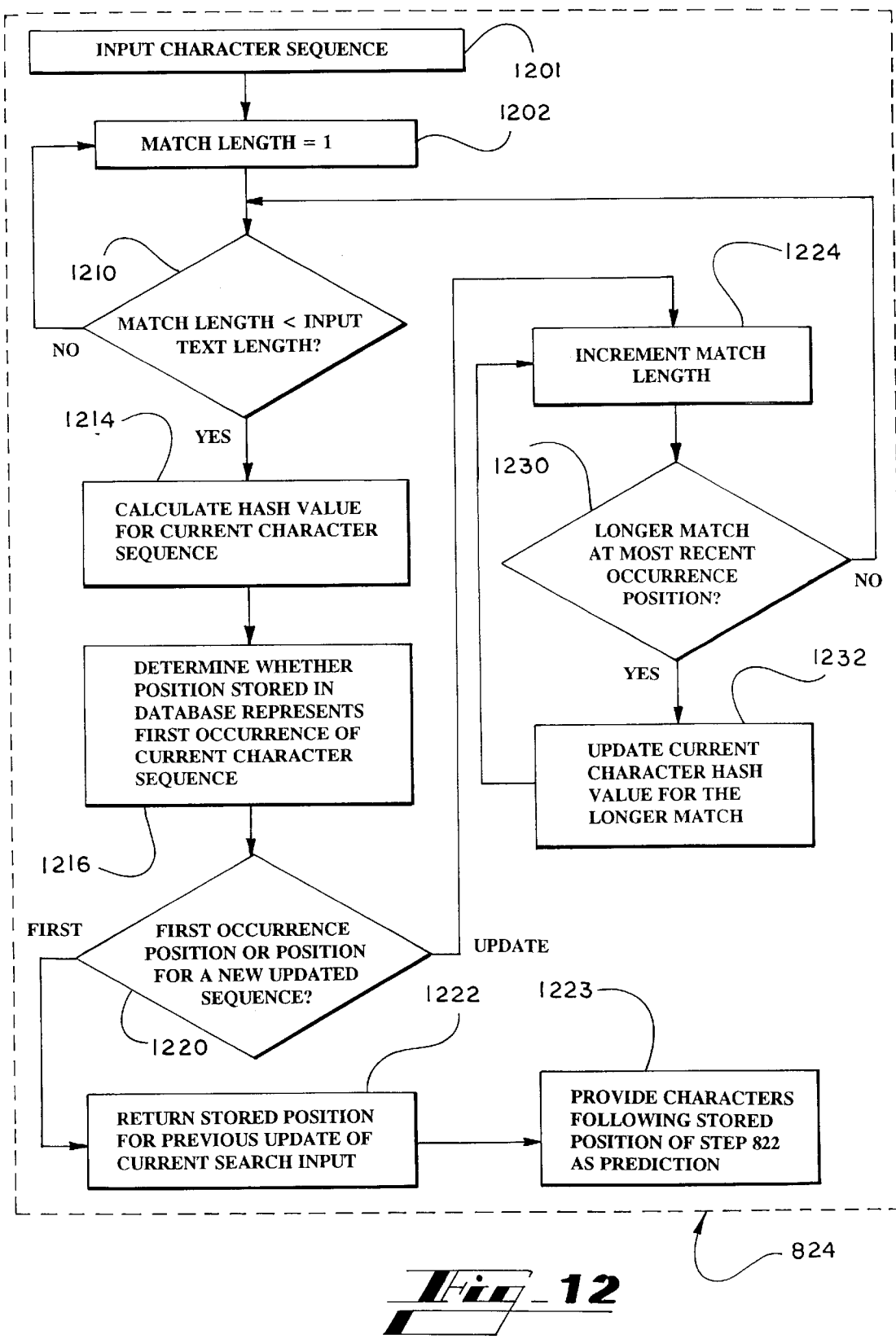
FIG. 12 illustrates a flow diagram of the hashing functions used in the preferred embodiment of the present invention to locate a sequence of characters in a text history array.

Referring to FIG. 12, the processes implemented in the preferred embodiment of the present invention for finding a character sequence in the history array is shown. The processes implemented for finding are similar to the processes implemented in the database updating process discussed in connection with FIG. 11, however, steps 1104, 1112 and 1118 are omitted and the text history length is replaced with a short string input from a particular window. At step 1201, a character string is received from a window or field of entry. At step 1202, a variable match length, mlength, is set to 1. The match length variable provides a count for the number of characters that match the character sequence as compared to the most recent occurrence of the character sequence in the text history array 54. At step 1210, a determination is made as to whether the match length is less than the history length. If the match length is not less than the history length, then at step 1210 the process returns to step 1202.

If, however, at step 1210, the match length is less than the history length the hash value for the current character sequence is calculated at step 1214. The hash function implemented to calculate the hash value for the current character sequence is:

$$CCHV = Hash(h[alength - mlength], CCHV) \qquad (4)$$

where alength is the length of the character string. The process then proceeds to step 1216. At step 1216, the database is accessed to get the history array position value for the current character sequence hash value CCHV. An invalid position will be returned at step 1216 if the character sequence has not occurred or a valid position, where the sequence is located in the history array, will be returned at step 1216. The process then proceeds to step 1220. At step 1220, a determination is made as to whether the stored database position obtained from step 1216 is the first occurrence of the character sequence (i.e. an invalid position). That is, has the character sequence been previously input in the history array and thus a valid position pointer for history array is stored at the CCHV location in the database. If, at step 1220, the position is not valid and thus is the first occurrence of character sequence then the process returns to step 1222 where the stored position for the previous update for the current search process is returned. If there has been a previous update step then the position for that update step represents the last matching position and thus will be returned as the prediction. If, however, the position stored for the current character sequence has occurred in the history array then the process proceeds to step 1224 where further processing of the current sequence will yield an updated database value to point to a longer sequence beginning with currently processed character sequence.

At step 1224, the match length, mlength, is incremented by 1. At step 1230, the next character, looking back mlength characters from the current character sequence in the history array 54, is compared to the character at the most recent occurrence position looking back in the history array mlength characters. If the character at the most recent occurrence position matches looking back in the history array mlength characters, then the current character hash value CCHV is updated according to the hash function (3) above. The process then proceeds to step 1224. If, at step 1230, the character at the most recent occurrence position did not match looking back in the history array mlength characters, the process proceeds to step 1210.

The processes of the present invention are discussed below in connection with specific examples. As noted above the information retrieval module 44 updates a database 50 and locates character sequences in a historic array 54. The information retrieval module 44 finds the position of the longest ending match of a short string A from a long history H. An ending match is a sequence of adjacent characters which occurs in both H and A (ignoring differences in case) and which includes the last character in A. For example H="Suzie sells seashells by the seashore" and A="what does Suzie s." In this example, H and A have a match sequence of: "s" at positions 1,7,11,13,16,21,30, and 33; " s" at positions 7, 13, and 30; "e s" at positions 7 and 30; and "ie s" at position 7 only. The longest match is thus at position 7.

An example implementing the method of the present invention for processing a text history array so that longest matches can be determined is discussed below. As noted above, the processes of the present invention maintain a database of values which are used to aid in searches though a history array of text. The time required to find the longest match is proportional to the length of the match. In contrast to other methods for find the longest match which have been used for prediction, the time required to the update database when H is appended to is very fast. If a character is added to the end of H to create a string H', the time required to update the database for efficient lookup of H' is proportional to the match length, mlength, of the longest ending match of H with H'. A method of processing a history array so that longest matches can be determined is discussed below in connection with FIGS. 3, 6, and 8.

Referring to FIGS. 3, 7 and 11, as noted above, the database is initialized to all invalid values. The below discussion uses shows how the input string "#Suzie sells seashells" is processed. The '#' character is added to the history array to serve as a history array bounds check. In this example, the first character processed is a unique character "#" which is not repeated in order to insure that no match sequences overlap the beginning of the history array. It should be appreciated by those skilled in the art that other history array bound checking techniques could be used.

The preferred method of bounds checking is to allocate memory "before" the start of the history buffer to ensure that there is no access error if the data before the beginning of the text history is overrun. It is preferable to allocate as much memory as the maximum allowed match length. When examining the characters in the history array, a check should be made to ensure that the match of characters is not longer than the maximum match length. Because the history array is a circular buffer, when the end of the history is reached, the maximum match length number of characters should be copied to the beginning of the history array. As known to those skilled in the art, by using this technique no special case is required during matching for patterns which start near the end of the history array and continue at the start of the history array.

Referring to FIG. 11, at step 1102, mlength (the match length) is initialized to 1. At step 1104, the input character '#' is added to the text history array 54 at position 1. At this point in the process, the current length of the text history array 54 is 1 and the mlength is also 1, so at step 1110, the process returns to step 1102. As before, at step 1102, the mlength is initialized to 1. The new input character 'S' is added to the text history array 54 at position 2 and hlength is incremented to 2. At this point in process mlength=1 is less than the history array length hlength=2. The process then proceeds to step 1112.

At step 1112, the hash value for the most recent occurrence (MROHV) of the current character sequence is generated which is a signature of the character sequence of length 1 starting at position 2 in the text history array 54: "S". Because the position of the most recent occurrence (posMRO) is initially set to equal the hlength, at step 1114, the characters hashed in step 1112 are the same as the characters hashed in step 1114 and thus, the hash value for the current character sequence (CCHV) has the same signature as generated in step 1112. In this example, the signatures are calculated according to the hash function (1) above with specific values substituted for the constants as follows:

$$\text{hash}(c, \text{seed}) = ((c+3297) \times (\text{seed}+43985)) \bmod 20945$$

where the character c is the ASCII representation of the character c as an integer.

Referring to FIG. 13, a table of hash values generated by the processes of the present invention for the character sequences processed in this example is shown. Because all non-zero seeds are generated by the result of another calculation of "hash(c, previously calculated_seed)", a relationship exist between the different seeds which is shown by the hash string (hstring). For example, the third row of the table in FIG. 13 shows hash('_', 13685)=11285. The character "_" is used here instead of the space character for illustration purposes. The hstring of "_se" indicates 11285= hash('_',hash('s',hash('e',0))).

Referring again to step 1112, the signature for "S" is given to be 1690. MROHV and CCHV are now both 1690. The CCHV signature is used to query the database 50 to find the position where the character sequence "S" has previously occurred in the history array. In this case, this character sequence "S" has not occurred previously so the position returned at step 1116 is an invalid position. At step 1118, the current position 2 of this sequence "S" is stored using the MROHV value of 1690. At step 1120, since the position that was originally stored in the database 50 was an invalid position at step 1116, the processing of this character "S" is complete. The process then returns to step 1102. Referring additionally to FIG. 14, a table shows the changes to the database 50 as the characters of this example are processed.

The next character of the example, 'u,' is processed. Again mlength is initialized to 1 at step 1112. The process completes as previously discussed with the processing of "S" except this time the position is 3 for sequence "u" which has signature 10085. The signature 10085 corresponding to "u" is used to store position 3 for later querying of the database 50. As with the processing of "S", "u" has not previously occurred. so the value returned at step 1116 from the database is an invalid position. The current position 3 of this sequence "u" is stored using the MROHV value of 10085. Because step 1116 yielded an invalid position value, the processing of "u" is complete and the process returns to step 1102.

So far 3 characters '#' "s", and 'u' have been processed from the full example "#Suzie sells seashells." The following characters 'z', 'i', 'e', and 's' all follow a similar pattern of processing as the processing of 'S' and 'u.'

Now, when the process encounters 'e' in "sells" the process takes additional steps to process this second occurrence of 'e' in the history array. As discussed above, mlength is initialized to 1 at step 602. The character 'e' is added to the history array 54 which now begins "#Suzie se". MROHV is calculated at step 1112 for the sequence 'e' to be 18445. Again at step 1114, CCHV is the same as MROHV at this point in the at step 1114. At step 1116, the database 50 is queried with signature 18445 to determine the last position that the sequence "e" has occurred. For the first time in this example an invalid position is not returned by the database 50. The position 11 is returned at step 1116 indicating that 'e' has previously occurred. Now, at step 1118 the current position 9, representing the 'e' in "sells", is stored using the new signature MROHV (which is also 18455). At this point, the process has determined that the character at position 9 in the history array matches the character at position 11 in the history array. Because 'e' has previously occurred and a pointer has been set to point to the current character 'e', the process proceeds to steps 1124, 1130, and 1132. At steps 1124, 1130, and 1132, the process is enabled to update the database to point to a longer non-matching sequence that occurred prior to the current sequence but which begins with currently processed character sequence. At steps 1124, 1130, and 1132, the process determines how many more characters match starting with positions 8 and 5, and counting backwards in the history array. At step 1130, since position 8 is a 's' and position 5 is an 'i', there are no further matches and the process proceeds to step 1110 with mlength=2.

Now, at step 1110, the processing of 'e' continues with mlength=2 because mlength is less than the history length hlength=9. At step 1112, the letter at position 5 ('i') is hashed with 18445 to get MROHV=17635. MROHV is the signature which represents the sequence "ie" since HASH (i,HASH(e,0))=17635. Similarly CCHV is calculated by hashing the letter at position 8 ('s') with 18445 to get CCHV=13685. CCHV is a signature representation of the sequence "se" since HASH(s,HASH(e,0))=13685. At step 1116, the database 50 is queried to determine if "se" has ever occurred in the history array 54. The position returned at step 1116 is an invalid position indicating that "se" has not previously occurred. The position 11 is stored at step 1118 in the database using MROHV=17635. Because the database position returned is an invalid position, we are through processing the 'e' in "sells".

Referring to FIG. 14, examination of the changes to the database 50 shows that position 6 had been stored earlier at signature 18455 for sequence "e." Position 6 was replaced with position '9,' while position 6 was stored at signature 17635 for sequence "ie". Thus, the changes to the database occurred so that the signature of each sequence stored in the database can be used to look up the most recent occurrence of the character sequence. The effect of processing the remainder of the characters in "#Suzie sells seashells" can be readily understood by one skilled in the art in light of the above figures and related discussion.

After setting up the database 50, the process searches for text to be predicted from the history array 54. The process for searching the processed text for the longest matching character sequence is similar to the text updating processed described above, the primary difference is that the database 50 is not modified. In the text updating process, the two signatures, MROHV and CCHV refer to two character sequences in the history array. The MROHV represents the sequence with the last character at the position of the longest match, the CCHV represents the sequence ending at the end of the history array 54.

In the find match position process, the sequence ending at the end of the history array is replaced with a new character string which is passed into the process for the new search. The find match position process shown in FIG. 13 carries out the same steps as the update text process shown in FIG. 12 except that steps 1204, 1212, and 1218 are omitted and the history length is replaced with the length of searched for string.

The following example for finding a match uses the input search string "Who sells s". The process produces the output "Who sells seashells." The database 50 has been set to find sequences from the string "#Suzie sells seashells" as discussed above. Referring to FIG. 12, at step 1202, mlength is initialized to 1. Because mlength is less than the input search string length, the process proceeds to step 1214. At step 1214, the signature CCHV, for "S" generated from the last character of "Who sells s" and is calculated to be 5895. The signature 5895 is used to query the database 50 at step 1216 for the most recent occurrence of a "s" which is found to be position 22. Position 22 is the final 's' in "seashells." Since position 22 is a valid position, the process proceeds to step 1224, where mlength is incremented.

At step 1230, the characters of the input search string counting back from the end of the input search string are compared with the characters of the text history array preceding the located position 22. At step 1230, the last space ' ' in "Who sells s" is compared with the last 'l' in "seashells." These two characters do not match so the process proceeds to step 1210 with mlength=2. The process proceeds to step 1214 where CCHV is calculated by hashing the ' ' character with the 5895 to get 20195. The signature 5895 is used to query the database 50 to get 14. Since 14 is a valid position, the match length is incremented to 3 at step 1224 and the characters in the input string ending with the final 's' in "Who sells" are compared at step 1230 with the characters from the history ending with "#Suzie sells." At step 1230, because the ending "s" of "sells" in "Who sells" matches the ending "s" of "# Suzie sells", the current input hash value is updated for the longer match by the hash function (4). These comparisons continue at each iteration through the steps 1224, 1230, and 1232 until mlength is 8 (i.e. when the 'e' in "#Suzie" is found to be different than the 'o' in "Who"). The process then continues to step 1210 with mlength equal to 8. The process proceeds to step 1214 where the character 'o' is hashed with the current signature to get 19525 which represents the sequence "o sell s". The signature 19525 is used to query the database 50 and an invalid position is returned indicating that this sequence has not previously occurred. So the process ends with the position 14 returned. The word prediction system takes the match position and writes out the characters from this position to the end of the word as the predicted text. This causes the text "seashells" to be written out as the completion for the partial text "Who sells s."

Figure 15:
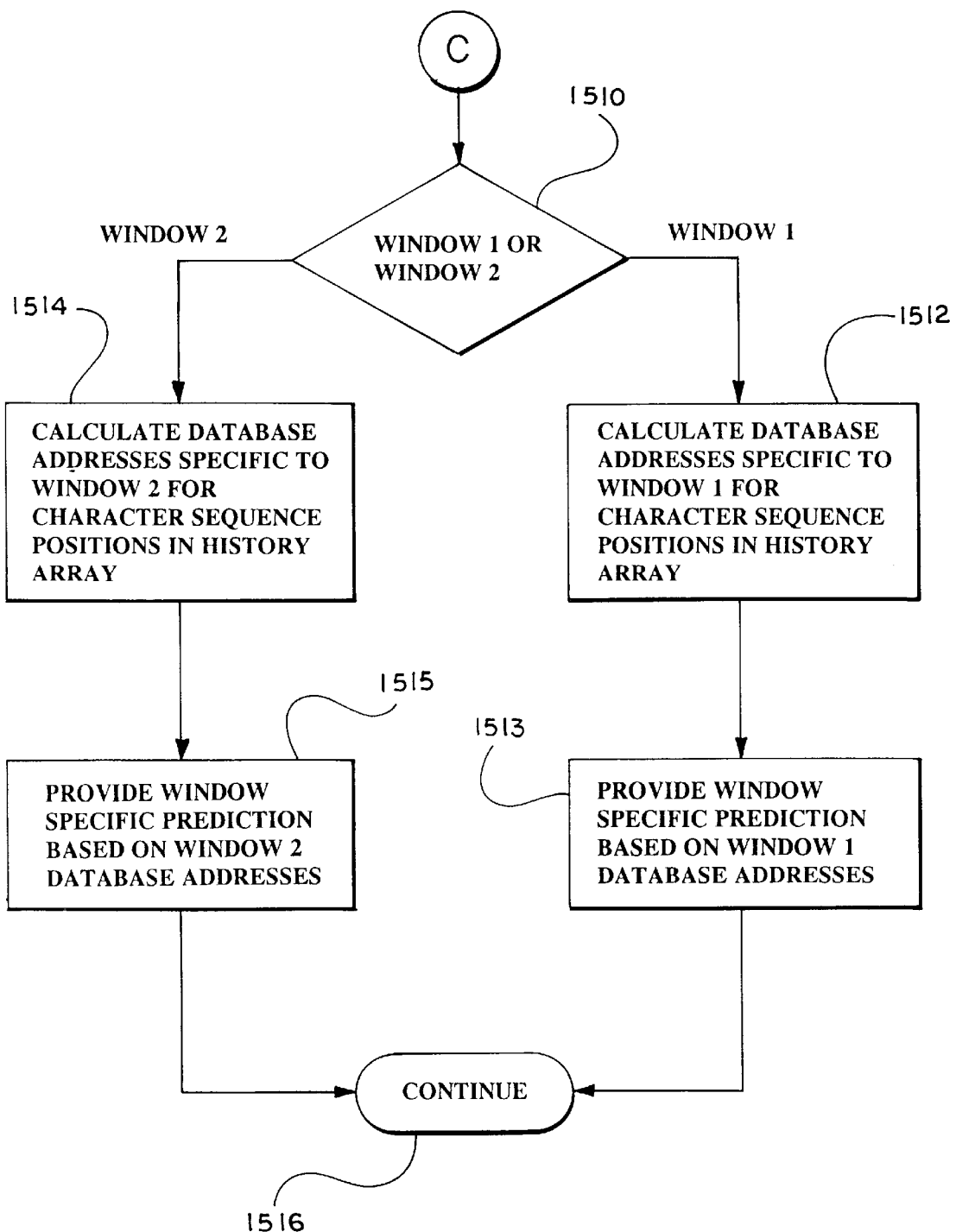
FIG. 15 illustrates a flow diagram illustrating the preferred process of calculating addresses for multi-window applications is shown.

As noted above, prior art word prediction systems are based upon text entered from within only a single window or single application. Referring to FIGS. 1, 3, and 15, the word prediction system 10 may be utilized across multiple windows to provide an individual and collective method to track the input text history across the multiple windows. A window or field of entry is a portion of a screen that contains its own document or message. In window-based programs, the screen can be divided into several windows, each of which has its own boundaries. Each window may contains its own menu or other controls.

The preferred embodiment of the present invention may provide a dynamically linked library, as known to those skilled in the art, to make the text history available across the system of windows. In a multi-window environment, the word prediction system 10 attempts to find the best match within the current window 62 in which the user is operating. The prediction system then may look for a better match available from the entire system of windows. In order to differentiate text input in a specific window, each window has a number constant associated with the window. Thus, different addresses are calculated for the database 50 for the same character sequences in the different windows.

By using window specific constants for calculating database addresses and an overall word prediction system constants for database address calculation, two different matches are returned: one is a best match in any context and the other is the best match within the current window. The system of priority of prediction between two matches returned is a matter of user design. For example, the longest match of the current window may constitute the prediction for the prediction system 10. If there is a tie between the lengths of the matches between system text history and the current window text history, the word prediction may be taken from the current window. Another design choice may require that the length of the match from any context be a certain length greater than the length of the match found from the current window.

Referring to FIG. 15, a flow diagram illustrating the preferred process of calculating addresses for multi-window applications is shown. The process of FIG. 15 continues from C of FIG. 5 as indicated. At step 1510, the computer determines which of the multiple windows or field of entry is currently operating. At step 1512, if window 1 is the current window, step 1122 is repeated using different number constants in the hash operations to provide database address locations specific to window 1 for the character sequence positions in the text history array 54. At step 1513, step 1124 is repeated with the window 1 database address values to provide a word prediction specific to window 1. At step 1514, if window 2 is the current window, steps 1122 and 1124 are repeated using different number constants in the hash operations to provide database address locations specific to window 2 for the character sequence positions in the text history array 54. At step 1515, step 1124 is repeated with the window 2 database address values to provide a word prediction specific to window 2.

In summary, in order to aid in making text predictions, the present invention builds a text history array of text as characters are input by a computer user and builds a database of values that are the positions of various character sequences in the history array. As characters are being input and added to the history array, an address is calculated, preferably by a hash coding technique, for the current input character sequence and the position of the character sequence in the history array is stored at the database address calculated for the input character sequence.

Each time a new input character is entered, the database is queried, using the calculated address, to determine if a valid position for the text history array has been stored at the calculated address, which indicates that the character sequence has previously occurred in the history array. If the character sequence has not previously occurred in the history array, then the position of the character sequence is stored in the database as discussed above. If the character sequence has previously occurred, the position of the current character sequence is stored in the database at the calculated address to replace the position for previous occurrence of the input sequence.

Additionally, after the present invention locates the position in the history array for which the current character sequence has most recently occurred, the adjacent preceding characters from the most recent occurrence position in the history array are compared against the adjacent preceding characters of input characters of the history array to locate the position at which the sequence does not match. An appropriate hash address location is calculated for the character that was determined not to match, and the position of the non-matching sequence, which begins with the originally located sequence, is stored to the database. By additionally updating the database to point to the longer character string at the most recent occurrence position, the database is updated continually updated to point to multiple character sequences that may begin with the same characters with permits direct addressing to locate different character sequences.

In order to provide a prediction for input characters based upon the history of text entered, the present invention calculates an address for the input character sequence, preferably by a hash coding technique as discussed above. The database is queried using the calculated hash address, and if the character sequence has previously occurred, the most recent position of the character sequence will be returned. The word prediction system may then display the longest match of characters for the most recent occurrence up to the next word.

The foregoing relates to the preferred embodiment of the present invention, and many changes may be made therein without departing from the scope of the invention as defined by the following claims.

I claim:

1. In a computer system, a computer-implemented method for predicting text for presentation on a display monitor, comprising the steps of:

receiving input text from a text input device;

providing said input text to a text prediction system within said computer system, said text prediction system comprising:
 a first text prediction module for predicting text based on a first text prediction method, and
 a second text prediction module for predicting text based on a second text prediction method;

analyzing said input text by said first text prediction method of said first text prediction module and providing a first output text prediction from said first text prediction module to said text prediction system;

analyzing said input text by said second text prediction method of said second text prediction module and providing a second output text prediction from said second text prediction module to said text prediction system, said second output text prediction capable of being contradictory when compared to said first output text prediction;

in response to receiving said first and second output text predictions, determining which of said output text predictions to display; and displaying said output text prediction, from said step of determining, to said display monitor.

2. The method of claim 1 further comprising the step of providing a first belief factor from said first text prediction module and providing a second belief factor from said second prediction module, said first belief factor indicative of the likelihood that said first output text prediction is correct and said second belief factor indicative of the likelihood that said second output text prediction is correct.

3. The method of claim 2 further comprising the step of determining whether said first output text prediction should be displayed or whether said second output text prediction should be displayed based on said first and second belief factors.

4. The method of claim 3 further comprising the step of providing a first reweighted belief factor to more accurately reflect the likelihood that said first output text prediction is correct and providing a second reweighted belief factor to more accurately reflect the likelihood that said second output text prediction is correct.

5. The method of claim 4 wherein said step of providing a first reweighted belief factor comprises determining said first reweighted belief factor based on the number of successful predictions provided by said first text prediction module within the text field of entry from which said first output text prediction is provided.

6. The method of claim 5 wherein said step of providing a second reweighted belief factor comprises determining said second reweighted belief factor based on the number of successful predictions provided by said second text prediction module within the text field of entry from which said second output text prediction is provided.

7. The method of claim 6 further comprising the step of determining whether said first output text prediction should be displayed or whether said second output text prediction should be displayed based on said first and second reweighted belief factors.

8. The method of claim 1 wherein said first text prediction method comprises providing said first output text prediction in the field of entry that said input text was entered, and providing said first output text prediction based on text that was entered in a second field of entry.

9. The method of claim 8 wherein said step of providing said first output text prediction based on text that was entered in a second field of entry comprises utilizing a second field of entry that is most likely to provide a correct prediction.

10. The method of claim 8 wherein said first text prediction method comprises:

accessing a list of pairs of identification numbers, each of said identification numbers representing an input text field of entry, the first of said identification numbers representing the field of entry from which the input text was entered and the second of said identification numbers representing said second field of entry; and providing said first output text prediction utilizing the text previously entered into said second field of entry represented by said second identification number.

11. The method of claim 10 wherein said step of providing said first output text prediction utilizing the text previously entered into said second field of entry represented by said second identification number comprises utilizing said second field of entry that is most likely to provide a correct prediction for the field of entry from which the input text was entered.

12. In a computer system, a computer-implemented method for predicting text for presentation on a display monitor, said text being entered within a plurality of fields of entry, comprising the steps of:

receiving input text within a first field of entry; and providing a first output text prediction in said first field of entry based on text that was entered in one of a plurality of second fields of entry.

13. The method of claim 12 wherein said step of providing said first output text prediction based on text that was entered in one of a plurality of second fields of entry comprises utilizing a second field of entry that is most likely to provide a correct prediction.

14. The method of claim 12 wherein said step of providing a first output text prediction in said first field of entry based on text that was entered in one of a plurality of second fields of entry, comprises:

accessing a list of pairs of identification numbers, each of said identification numbers representing an input text field of entry, the first of said identification numbers of one of said pairs representing the field of entry from which the input text was entered and the second of said identification numbers of said one of said pairs representing said one of said plurality of second fields of entry; and providing said first output text prediction utilizing the text previously entered into said one of said second fields of entry represented by said second identification number.

15. The method of claim 14 wherein said step of providing said first output text prediction utilizing the text previously entered into said second field of entry represented by said second identification number comprises utilizing said second field of entry that is most likely to provide a correct prediction for the field of entry from which the input text was entered.

16. The method of claim 14 wherein said step of providing said first output text prediction utilizing the text previously entered into said one of said second fields of entry represented by said second identification number comprises selecting said one of said second fields of entry which has the first identification of the pair that is the same as the identification number of the field of entry from which the input text was entered.

17. The method of claim 14 wherein said step of providing said first output text prediction utilizing the text previously entered into said one of said second fields of entry represented by said second identification number comprises selecting said one of said second fields of entry which has the first identification of the pair that is the same as the identification number of the field of entry from which the input text was entered and said first identification number represents the first identification number that occurs most is said list of pairs.

18. In a computer system, a computer-implemented method for predicting text for presentation on a display monitor, comprising the steps of:

receiving input text from a text input device;

providing multiple text predictions for said input text;

providing belief factors for each of said predictions, said belief factors based on the number of successful predictions provided within particular text fields of entry from which said text prediction were provided; and displaying the text prediction having the highest belief factor to said display monitor.

19. In a computer system, a computer-implemented method of organizing text within a text prediction system, said text prediction system operating within a computer system having a first window and a second window, comprising the steps of:

receiving input text from a text input device;

storing said input text, entered within either said first window or said second window, in a common text history array; and independently associating text entered within said first window from text entered within said second window; and providing a first output text prediction based on text enter within said first window, said first output text prediction based on text stored in said common text history array and providing a second output text prediction for text entered within said second window, said second output text prediction based on text stored in said common text history array.

20. A computer-implemented method of processing text for a word prediction system, comprising the steps of:

receiving a plurality of input character sequences in a computer system;

inputting each of said input character sequences in ordered positions in an array of text;

generating a number identifier representative of each of said input character sequences;

using said number identifier as an address into a database;

storing, in said database at said address, the position of said character sequence in said ordered array of text; and replacing, in said database at said address, the position of said character sequence with the position of the most recent occurrence said character sequence in said array of text.

21. A computer-implemented method of locating text in a text history array of a word prediction system, comprising the steps of:

generating a pseudo random number identifier for an input character sequence, said number identifier being an address location for a database operable to store pointers, said stored pointers pointing to characters previously entered into said text history array of characters;

determining whether a pointer exists at said address location for said input character sequence, said pointer pointing to the most recent occurrence of said input character sequence in said text history array;

locating in said text history array of characters the position of the longest most recent occurrence of said character sequence; and displaying a text prediction which completes the word beginning with said longest most recent occurrence of said character sequence.

22. In a computer system, a computer-implemented method for storing text utilized for predicting text for presentation on a display monitor, comprising the steps of:

storing character sequences in a text history array in the order in which said character sequences are input;

in response to characters being input to the history array, calculating a database address that is representative of the current input character sequence;

accessing said database with said database address to determine if a valid position for the text history array is stored at said database address, thereby indicating that said character sequence has previously occurred in said text history array;

storing the position of the character sequence of the text history array in the database at the calculated address for said input character sequence, if the character sequence has not previously occurred in the text history array;

if the character sequence has previously occurred, storing the position of the current input character sequence in the database at said calculated database address so as to replace the position of the text history array stored for the previous occurrence of the input sequence located at said database address;

after locating the position in the history array for which the current character sequence has previously occurred, comparing the adjacent preceding characters from the most recent occurrence position in the history array against the adjacent preceding characters of said input character sequence of the history array to locate the character and the position at which the sequence does not match thereby identifying a non-matching character sequence which begins with the current input character sequence;

calculating a database address for the non-matching sequence that is representative of the non-matching character sequence input character sequence; and storing the position of the non-matching sequence to the database at the address calculated for the non-matching sequence.

\* \* \* \* \*